United States Patent
Shi

(10) Patent No.: US 12,553,080 B2
(45) Date of Patent: Feb. 17, 2026

US012553080B2

(54) LAMP PRIMER SET AND METHOD FOR AMPLIFYING NUCLEIC ACIDS USING THE SAME

(71) Applicant: Delta Electronics Int'l (Singapore) Pte Ltd, Singapore (SG)

(72) Inventor: Fengying Shi, Singapore (SG)

(*) Notice: Subject to any disclaimer, the term of this patent is extended or adjusted under 35 U.S.C. 154(b) by 811 days.

(21) Appl. No.: 17/839,014

(22) Filed: Jun. 13, 2022

(65) Prior Publication Data
US 2023/0022928 A1    Jan. 26, 2023

(30) Foreign Application Priority Data

Jun. 14, 2021   (SG) ..................... 10202106339P

(51) Int. Cl.
*C12Q 1/6844* (2018.01)

(52) U.S. Cl.
CPC ...... *C12Q 1/6844* (2013.01); *C12Q 2531/119* (2013.01); *C12Q 2600/16* (2013.01)

(58) Field of Classification Search
CPC ............ C12Q 1/6844; C12Q 2531/119; C12Q 2600/16; C12Q 1/6848
See application file for complete search history.

(56) References Cited

U.S. PATENT DOCUMENTS

| | | | |
|---|---|---|---|
| 8,017,357 B2 | 9/2011 | Notomi et al. | |
| 9,315,863 B2 | 4/2016 | Nadeau | |
| 9,410,190 B2 | 8/2016 | Tisi et al. | |
| 10,155,977 B2 | 12/2018 | Ling | |
| 10,364,458 B2 | 7/2019 | Nobile et al. | |
| 2019/0203271 A1 | 7/2019 | Wang et al. | |

FOREIGN PATENT DOCUMENTS

| | | | |
|---|---|---|---|
| CN | 102712944 A | 10/2012 | |
| CN | 105349526 B | 10/2018 | |
| CN | 105755134 B | 2/2020 | |
| CN | 112195275 | * | 1/2021 |
| WO | 2011056933 A1 | 5/2011 | |

OTHER PUBLICATIONS

Parida et al., Rev. Med. Virol. 18: 407-4 (Year: 2008).*
Jia et al., Methods, 10 (28660): 1-9, (Dec. 2016).*
Notomi et al., Loop-mediated isothermal amplification of DNA, Nucleic Acids Research, vol. 28, Issue 12, Jun. 15, 2000, p. e63.
Nagamine et al. Accelerated reaction by loop-mediated isothermal amplification using loop primers. Mol Cell Probes. Jun. 2002; 16(3):223-9.
Gandelman et al. Loop-mediated amplification accelerated by stem primers. Int J Mol Sci. 2011; 12(12):9108-9124.
Martineau et al. Improved Performance of Loop-Mediated Isothermal Amplification Assays via Swarm Priming. Anal Chem. Jan. 3, 2017; 89(1):625-632.
Suzuki et al. Heat denaturation increases the sensitivity of the cytomegalovirus loop-mediated isothermal amplification method. Microbiol Immunol. Aug. 2010;54(8):466-70.
Wang et al. Two Methods for Increased Specificity and Sensitivity in Loop-Mediated Isothermal Amplification. Molecules. 2015; 20(4):6048-6059.
K. Malpartida-Cardenas et al., "Allele-Specific Isothermal Amplification Method Using Unmodified Self-Stabilizing Competitive Primers," Anal. Chem., Sep. 18, 2018, vol. 90, No. 20, pp. 11972-11980.

* cited by examiner

*Primary Examiner* — Cynthia B Wilder
(74) *Attorney, Agent, or Firm* — KIRTON McCONKIE; Evan R. Witt

(57) ABSTRACT

A LAMP primer set includes original LAMP primers of FIP, BIP, F3, and B3, and at least one autonomy primer. The original LAMP primers target regions F3, F2, F1C, B1C, B2, and B3 on nucleic acids, and the regions F3, F2, F1, B1C, B2C and B 3 C are located in order from 5' end to 3' end of a forward strand of the nucleic acids. The primer FIP includes oligonucleotides targeting F1C and F2, and the primer BIP includes oligonucleotides targeting B1C and B2. The at least one autonomy primer targets a region located beyond a region from F3 to B3.

20 Claims, 28 Drawing Sheets

Specification includes a Sequence Listing.

FIG. 6A

| Label | 5'pos | 3'pos | Length | Tm | GC% | Sequence | |
|---|---|---|---|---|---|---|---|
| F5 | 446 | 464 | 19 | 57.31 | 0.42 | ACATGAACAACAGAGATGC | (SEQ ID NO: 2) |
| F4 | 480 | 499 | 20 | 57.98 | 0.45 | GGAGGAAGTAAACACTCAGA | (SEQ ID NO: 3) |
| F3 | 511 | 531 | 21 | 57.89 | 0.38 | TTCCGTTTGACAATAAGAAGG | (SEQ ID NO: 4) |
| B3 | 707 | 724 | 18 | 58.67 | 0.5 | AATTGAGGATCCGATGGC | (SEQ ID NO: 5) |
| B4 | 727 | 746 | 20 | 58.90 | 0.45 | TCATTAAGACGCTCGAAGAG | (SEQ ID NO: 6) |
| B5 | 754 | 771 | 19 | 59.08 | 0.44 | TGCTCGAATTGGCTTTGA | (SEQ ID NO: 7) |

FIG. 6B

SEQUENCE LISTING

```
<160> NUMBER OF SEQ ID NOS: 7

<210> SEQ ID NO 1
<211> LENGTH: 704
<212> TYPE: DNA
<213> ORGANISM: Influenza B virus

<400> SEQUENCE: 1
ttcctcagaa agcaactgtc cgaaatacag ttggattgat tacccttcaa ccccagggag      60
gtgccttgat gacatagaag aagaaccaga tgatgttgat ggcccaactg aaatagtatt     120
aagagacatg aacaacagag atgcaaggca aaagataaag gaggaagtaa acactcagaa     180
agaagggaag ttccgtttga caataagaag ggatatgcgt aatgtattgt ccctgagagt     240
gttagtaaac ggaacattcc tcaaacaccc caatggatac aagtccttat caactctaca     300
tagattgaat gcatatgacc agagtggaag gcttgttgct aaacttgttg ctactgatga     360
tcttacagtg gaggatgaag aagatggcca tcggatcctc aattcactct tcgagcgtct     420
taatgaagga cattccaaagc caattcgagc agctgaaact gcggtgggag tcttatccca     480
atttggtcaa gagcaccgac tatcaccaga agagggagac aattagactg gtcacggaag     540
```

```
aactttatct tttaagtaaa agaattgatg ataacatatt gttccacaaa acagtgatag    600
ctaacagctc cataatagct gacatggttg tatcattatc attattagaa acattgtatg    660
aaatgaagga tgtggttgaa gtgtacagca ggcagtgctt gtga                    704
```

<210> SEQ ID NO 2
<211> LENGTH: 19
<212> TYPE: DNA
<213> ORGANISM: Artificial Sequence
<220> FEATURE:
<223> OTHER INFORMATION: Synthetically generated primer

<400> SEQUENCE: 2

```
acatgaacaa cagagatgc                                                 19
```

<210> SEQ ID NO 3
<211> LENGTH: 20
<212> TYPE: DNA
<213> ORGANISM: Artificial Sequence
<220> FEATURE:
<223> OTHER INFORMATION: Synthetically generated primer

<400> SEQUENCE: 3

```
ggaggaagta aacactcaga                                                20
```

<210> SEQ ID NO 4
<211> LENGTH: 21
<212> TYPE: DNA
<213> ORGANISM: Artificial Sequence
<220> FEATURE:
<223> OTHER INFORMATION: Synthetically generated primer

<400> SEQUENCE: 4

```
ttccgtttga caataagaag g                                              21
```

<210> SEQ ID NO 5
<211> LENGTH: 18
<212> TYPE: DNA
<213> ORGANISM: Artificial Sequence
<220> FEATURE:
<223> OTHER INFORMATION: Synthetically generated primer

<400> SEQUENCE: 5

```
aattgaggat ccgatggc                                                  18
```

<210> SEQ ID NO 6
<211> LENGTH: 20
<212> TYPE: DNA
<213> ORGANISM: Artificial Sequence
<220> FEATURE:
<223> OTHER INFORMATION: Synthetically generated primer

<400> SEQUENCE: 6

```
tcattaagac gctcgaagag                                                20
```

<210> SEQ ID NO 7
<211> LENGTH: 18
<212> TYPE: DNA
<213> ORGANISM: Artificial Sequence
<220> FEATURE:
<223> OTHER INFORMATION: Synthetically generated primer

<400> SEQUENCE: 7

```
tgctcgaatt ggctttga                                                  18
```

LAMP PRIMER SET AND METHOD FOR AMPLIFYING NUCLEIC ACIDS USING THE SAME

FIELD OF THE INVENTION

The present disclosure relates to a LAMP primer set, and more particularly to a LAMP primer set with additional autonomy primers.

BACKGROUND OF THE INVENTION

Since its disclosure in early 2000 by Notomi et al. from Eiken Chemical Co. Ltd in Japan, loop mediated isothermal amplification (LAMP) was intensively and extensively employed in assay development for rapid diagnosis of plant pathogens or infectious disease agents especially in field settings thanks to its simplicity, specificity, sensitivity, and rapidity. Increased specificity was achieved as four or six pieces of specific primers targeting six or eight stretches of unique sequences of the nucleic acids of interest were designed.

FIG. 1 shows the schematic illustration of the original primers designed for LAMP. A set of 4 LAMP primers includes F3, B3, FIP, and BIP. The FIP and BIP are called inner primers, each of which is made up of two primers head-to-tail connected or with a TTTT linker. These 4 primers target 6 regions, namely F3, F2, F1C, B1C, B2, and B3 of the target templates. Melting temperatures (Tins) for the regions F1C and B1C are higher than those of the regions F2 and B2, which in turn are higher than those of the regions F3 and B3 to ensure faster annealing and earlier amplification from the primers FIP and BIP than the primers F3 and B3. The primers F3 and B3 are displacement primers whose amplification will displace amplicons generated by the primers FIP and BIP, which will serve as templates for the step of cycling amplification. Amplification directions of the 4 LAMP primers are indicated by black arrows.

Special design and working mechanism with more numbers and higher primer concentrations used in LAMP deliver improved sensitivity compared to most PCR-based detection assays. Isothermal amplification enabled by self-priming as a result of special primer design and utilization of polymerases with strand-displacement activity, LAMP takes place at constant temperatures, usually 60-65° C., depending on the polymerases used, negating the necessity of a thermal cycler. In addition, positive detection is usually achieved within 30 minutes and is amenable to visual detection by colorimetry or turbidity. Taken together, LAMP is an ideal nucleic acid amplification and detection technology fulfilling WHO's requirements for point-of-care/point-of-need assays.

While LAMP is regarded to have superior sensitivity compared to most PCR-based amplification methods, low sensitivity can be an issue since the reaction temperature used is in the range of 60-65° C., which is usually inefficient to denature targets especially those with high GC contents and/or strong secondary structures. Poor performance of some primers can sometimes be solved by picking different sets of LAMP primers. It is thus common practice to pick several sets of primer candidates to screen for the ones with better detection sensitivities. In addition, improved sensitivity can be achieved through reaction optimization. All components involved in the reaction can be potential components to be optimized, such as reaction temperature, types of polymerases, amount of the enzymes, concentrations of primers, dNTPs, magnesium ion, and use of reaction enhancing additives such as dimethyl sulfoxide (DMSO) and betaine.

While reaction optimization can generally help with detection improvement for any target in question, there have been a couple of publications aiming for specific improvement of detection sensitivity by incorporating additional primers besides the original set of 4 primers. Introduction of loop primers has greatly improved detection sensitivity and halved the detection time in the modified LAMP compared to the original LAMP without loop primers. In this modified version of LAMP, the loop primers initiate additional amplification by targeting loop structure of the amplicons generated by the original LAMP method. Further addition of primers named stein primers and swarm primers to the modified LAMP reaction deliver extra sensitivity for target detection by LAMP. The stein primers anneal to the stein structures of the amplicons generated by the modified LAMP method while the swarm primers with complete or substantial overlap of the regions F1C and B1C help to generate single-strand templates for inner primers during their extension.

FIG. 2 shows the schematic illustration of the additional primers designed to improve the original LAMP. The loop forward (LF) and the loop backward (LB) primers are located between the regions F2C and F1C, and the regions B1C and B2C respectively. They have specific orientations and their amplification directions are shown by black arrows. The stein primers are located between the regions F1 and B 1. It is reported that multiple stein primers are allowed and more beneficial than single stein primer. Their orientations and thus amplification can be at both directions. Swarm primers are significantly or completely overlapping the regions F1C and B1C to amplify the regions F1 and B1 respectively and their extension directions are shown by black arrows.

The aforementioned methods to specifically improve detection sensitivity by additional primers target regions within F3-B3 boundaries. Feasibility to include those additional primers depends on the original LAMP primer design. Only when there are rooms for primer design between the regions F2C and F1C, between the regions B2C and B1C and between the regions F1 and B 1, loop and stein primers become possible. However, it is common that there is no space for those additional primers. Under such circumstances, there is a need to provide a novel method to design and use additional primers, which is not restricted by space for specific improvement of detection sensitivity for LAMP.

SUMMARY OF THE INVENTION

An object of the embodiments of the present disclosure is to provide a LAMP primer set with additional autonomy primers for improving detection sensitivity for LAMP.

Another object of the embodiments of the present disclosure is to provide a method for amplifying nucleic acids by a LAMP primer set with additional autonomy primers for improving detection sensitivity for LAMP.

According to an aspect of an embodiment of the present disclosure, there is provided a LAMP primer set including original LAMP primers of FIP, BIP, F3, and B3, and at least one autonomy primer. The original LAMP primers target regions F3, F2, F1C, B1C, B2, and B3 on nucleic acids, and the regions F3, F2, F1, B1C, B2C, and B3C are located in order from 5' end to 3' end of a forward strand of the nucleic acids. The primer FIP includes oligonucleotides targeting the regions F1C and F2, and the primer BIP includes oligonucleotides targeting the regions B1C and B2. The at least one autonomy primer targets a region located beyond a region from F3 to B3.

According to another aspect of an embodiment of the present disclosure, there is provided a method for amplifying nucleic acids. The method includes steps of providing original LAMP primers of FIP, BIP, F3, and B3, providing at least one autonomy primer, and amplifying nucleic acids of a sample with the original LAMP primers and the at least one autonomy primer. The original LAMP primers target regions F3, F2, F1C, B1C, B2, and B3 on nucleic acids, and the regions F3, F2, F1, B1C, B2C, and B3C are located in order from 5' end to 3' end of a forward strand of the nucleic acids. The primer FIP includes oligonucleotides targeting the regions F1C and F2, and the primer BIP includes oligonucleotides targeting the regions B1C and B2. The at least one autonomy primer targets a region located beyond a region from F3 to B3.

In an embodiment, the nucleic acids are amplified using a polymerase with strand-displacement activity.

The use of the word "a" or "an" when used in conjunction with the term "comprising/including" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternative are mutually exclusive, although the disclosure supports a definition that refers to only alternatives and "and/or."

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

FIGS. 6A and 6B show an example demonstrating the design of the autonomy primers for Influenza virus B;

DETAILED DESCRIPTION OF THE PREFERRED EMBODIMENT

Figure 1:
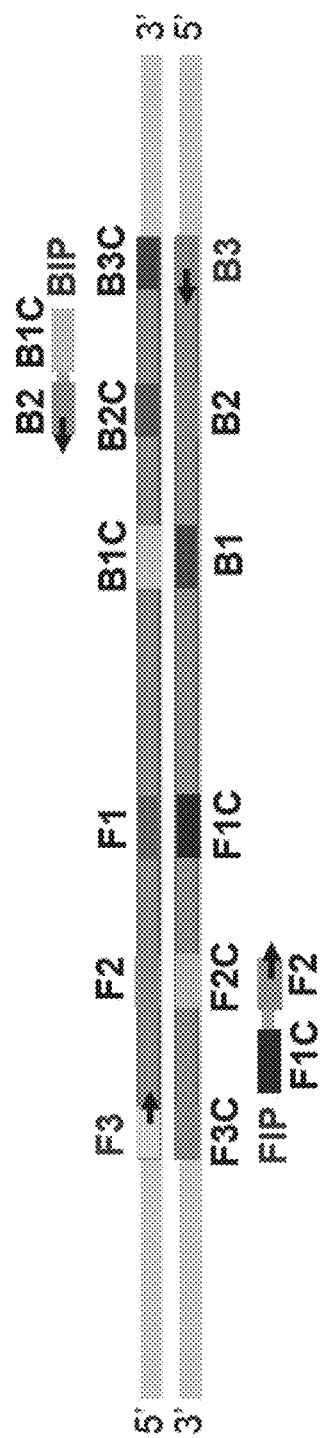
FIG. 1 shows the schematic illustration of the original primers designed for LAMP.
Figure 2:
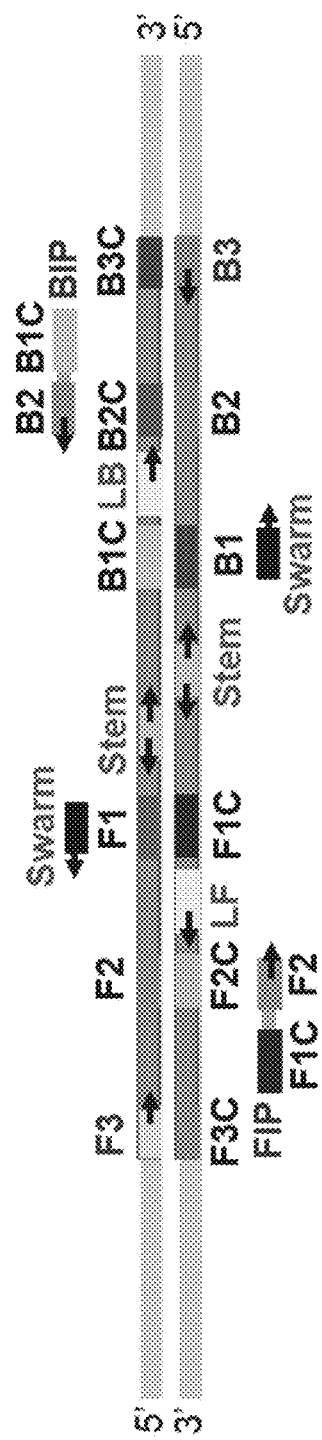
FIG. 2 shows the schematic illustration of the additional primers designed to improve the original LAMP.

The present disclosure will now be described more specifically with reference to the following embodiments. It is to be noted that the following descriptions of the embodiments of this disclosure are presented herein for purpose of illustration and description only; it is not intended to be exhaustive or to be limited to the precise form disclosed.

The embodiment of the present disclosure relates to a novel method for design and use of additional primers to improve detection sensitivity in forms of earlier detection, more consistent amplification curves, and/or higher detection rates for both DNA and RNA templates exemplified by loop mediated isothermal amplification (LAMP). These additional primers are named autonomy primers as their design and use enjoy unprecedented freedom compared to the other aforementioned additional primers whose feasibility and numbers are restricted by the original LAMP primer design as explained earlier. As the purpose of inclusion autonomy primers is to improve detection sensitivity by LAMP, the prerequisite is to have a working LAMP primer set that is able to react with the correct templates with sensitivity desired to be improved and no amplification in the No Template Control (NTC).

A basic LAMP primer set includes four primers targeting six regions of nucleic acid strands, named F3, F2, F1C, B1C, B2, and B3. The six regions F3, F2, F1, B1C, B2C and B3C are located in order from 5' end to 3' end of the forward strand in double stranded DNA, meaning the region F3 is upstream of the region F2 which in turn upstream of the region F1 and so on. Therefore, the regions F3 and B3 are located at the most outside while the regions F1 and B1C are at the most inside. Oligonucleotides targeting the regions F1C and F2 are connected tail-to-head with or without additional nucleotide to form one primer named FIP. Oligonucleotides targeting the regions B1C and B2 are connected tail-to-head with or without additional nucleotide to form one primer named BIP. For some templates, inclusion of additional primers named loop primers LF and LB targeting regions between F2C and F1C and between B1C and B2C can accelerate reaction speed. In such cases, there are 6 LAMP primers targeting 8 regions of nucleic acid strands. The primers are substantially complementary to their targeting regions for stable annealing and extension under conditions provided. Functionally, the primers F3 and B3 include displacement primers, causing displacement and release of downstream polynucleotides generated by extension of the primers FIP and BIP.

The working LAMP primer set including the original four primers (i.e. F3, B3, FIP, and BIP) with or without two subsequently designed loop primers (i.e. LF and LB) is the anchor point for the autonomy primers. The autonomy primers are designed to target sequences located outside the region from F3 to B3 of the original LAMP primer design. Therefore, there may be no space limitation, and feasibility is guaranteed. In theory, unlimited numbers of the autonomy primers are possible to be designed as they are targeting sequences beyond the region from F3 to B3.

In some embodiments, each of the regions F3, F2, F1C, B1C, B2, and B3 may include 10 to 30 nucleotides, and thus, the region from F3 to B3 may be at least 200 nucleotides long, but not limited thereto.

The autonomy primers are additional primers introduced to improve target detection based on LAMP method. They target regions outside the regions F3 and B3C. In the case of 1 pair of the autonomy primers, i.e. F4 and B4, all the targeted regions in order from 5' end to 3' end of the forward strand in double stranded DNA include F4, F3, F2, F1, B1C, B2C, B3C, and B4C. In the case of 2 pairs of the autonomy primers, i.e. F4 and B4 and F5 and B5, all the targeted regions in order from 5' end to 3' end of the forward strand in double stranded DNA include F5, F4, F3, F2, F1, B1C, B2C, B3C, B4C, and B5C.

Figure 3:
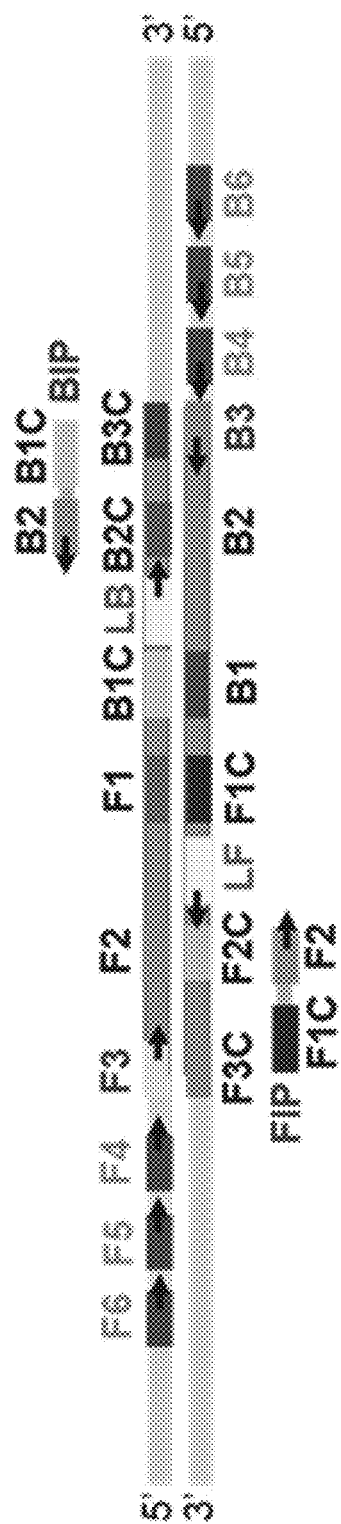
FIG. 3 shows the schematic illustration of 3 pairs of the autonomy primers.

Nomenclature of the autonomy primers is as follows for purpose of demonstration and simplicity in description: those having the same orientation as the primer F3 bear F to indicate their forward orientation and those having the same orientation as the primer B3 bear B to indicate their backward orientation; a numeral suffix is attached to the Fs and Bs to indicate their relative locations to the primers F3 and B3 with the autonomy primers bearing small numbers located closer to the primers F3 and B3 than those with larger numbers. FIG. 3 shows the schematic illustration of 3 pairs of the autonomy primers, i.e. F4 and B4, F5 and B5, and F6 and B6, to demonstrate their locations to the LAMP primers and their nomenclature. The autonomy primers are located upstream of the primers F3 and B3 and have the same orientation as the primers F3 and B3. They are functioned as displacement primers as the primers F3 and B3. Theoretically, unrestricted locations and unlimited numbers of the autonomy primers can be designed as long as they are beyond the region from F3 to B3. Orientations and thus amplification directions of the autonomy primers are shown by the associated black arrows. According to the nomenclature, the primers F4 and B4 are closer than the primers F5 and B5 which are in turn closer than the primers F6 and B6 to the primers F3 and B3.

Figure 4:
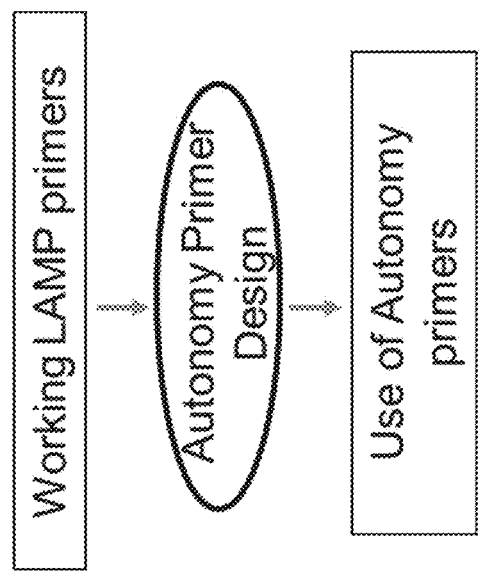
FIG. 4 shows the workflow for design and use of the autonomy primers for improving detection sensitivity by LAMP.

FIG. 4 shows the workflow for design and use of the autonomy primers for improving detection sensitivity by LAMP. The design for the autonomy primers occurs after working LAMP primer sets are obtained. The autonomy primers are introduced to increase detection sensitivity of the original working LAMP primer sets. There are many ways to get working LAMP primers, such as by designing and screening or extracting from publications. Once working LAMP primer sets including F3, B3, FIP, and BIP with or without loop primers are obtained, the autonomy primer design is started. Since the autonomy primers act similarly to the primers F3 and B3, the designing parameters for the primers F3 and B3 are used to design the autonomy primers. For example, the autonomy primers have similar Tin as the primers F3 and B3 do. Checking for primer interaction is highly recommended to prevent potentially detrimental effects of these additional primers to LAMP reactions.

Although relative locations and numbers of the autonomy primers to be designed are theoretically unrestricted and unlimited as long as they are targeting sequences beyond the region from F3 to B3, actual location of each autonomy primer and the numbers of the autonomy primers to be designed and used for a certain target are determined by many factors, such as sequence alignment results, the concentrations of these primers and the capacity of the LAMP reaction setup allowing for sufficient extension of the autonomy primers and maximal generation of LAMP amplicons.

While the autonomy primers targeting either strand of DNA are speculatively beneficial for detection sensitivity, such primers against both strands of DNA targets and RNA and its resultant cDNA in form of pairs are to be included in the present disclosure. In other words, the nucleic acids targeted by the autonomy primers refer to either DNA or RNA or hybrid of both, which are various lengths of oligonucleotide or polynucleotide. The nucleic acids may be single or double-stranded and represent the sense or antisense strand, and they can be naturally present or artificially synthesized.

Figure 5A:
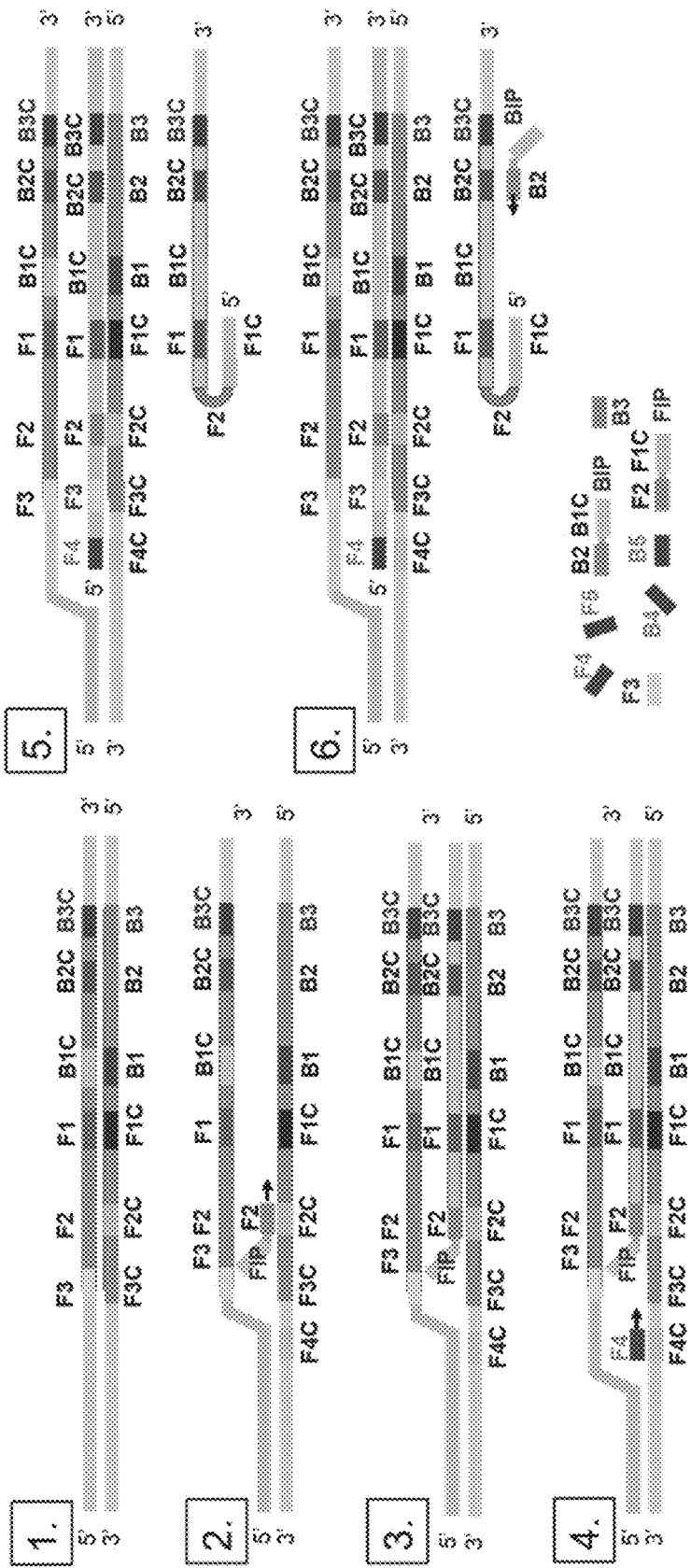
FIGS. 5A and 5B show working mechanisms of the autonomy primers.
Figure 5B:
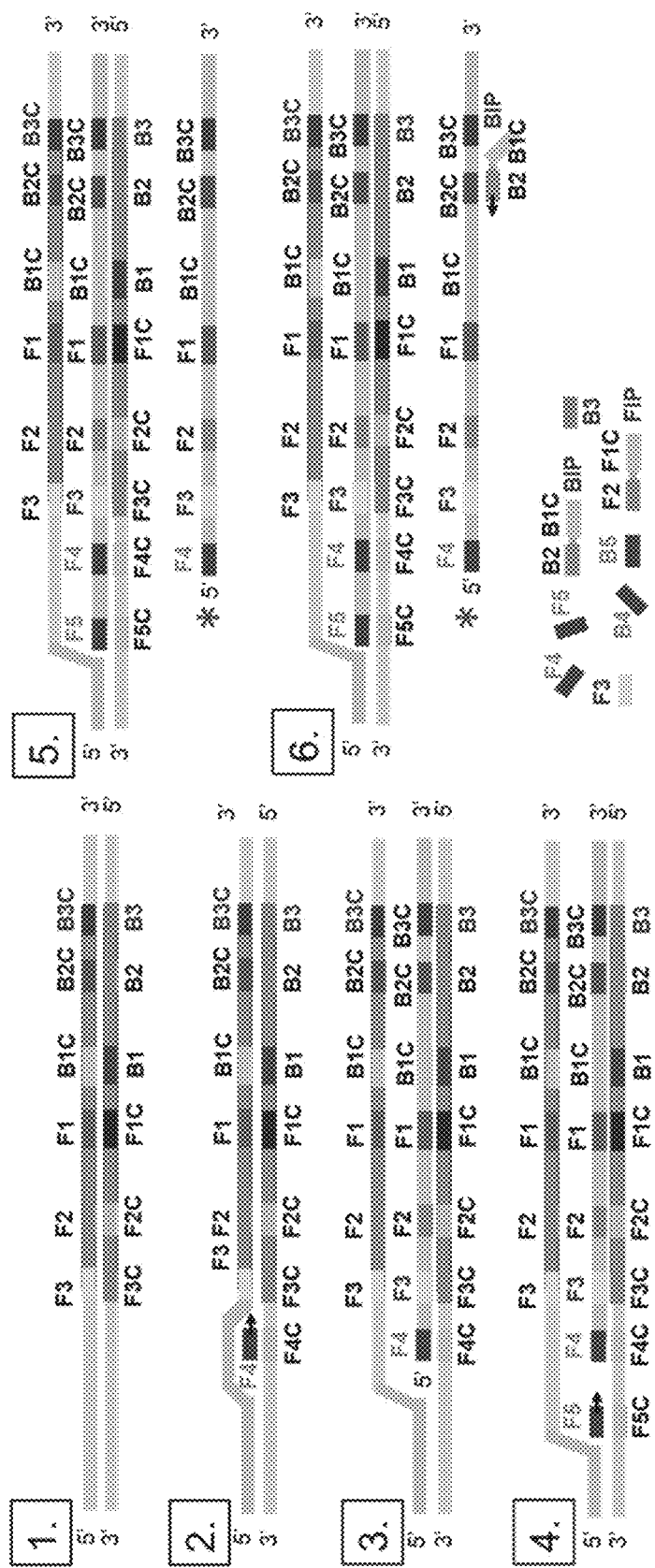

FIGS. 5A and 5B show working mechanisms of the autonomy primers. For simplicity, only two pairs of the autonomy primers (F4, B4, F5, and B5) are added to the original LAMP primer set including F3, B3, FIP, and BIP without loop primers. The autonomy primers are named in sequential manner to indicate their relative locations to the primers F3 and B3, however, binding and extension of these primers can happen before, after and at the same time as the primers F3 and B3. Mechanism one shown in FIG. 5A is that the autonomy primers act as the displacement primers F3 and B3 to displace the amplicons generated by the primer FIP (steps 4-5 in FIG. 5A), and generate templates for the primer BIP (step 5-6 in FIG. 5A). Mechanism two shown in FIG. 5B is that the amplicon generated by the autonomy primer located closer to the primer F3 (i.e. the primer F4) will be displaced by the autonomy primer located at its upstream (i.e. the primer F5; steps 4-5 in FIG. 5B), which provides single-stranded templates for the primer BIP (steps 5-6 with asterisks in FIG. 5B).

In other words, the extension of these autonomy primers acts similarly with the primers F3 and B3 from the original LAMP primer design, helping displacement and detachment of amplicons generated from extension of the primers FIP and BIP with the characteristic stein-loop structure from the original nucleic acid templates (as shown in FIG. 5A). Further, the extension of the autonomy primers helps amplify templates for LAMP primers, i.e. F3, B3, LF, LB, FIP, and BIP. In addition, the templates generated and displaced by the autonomy primers are theoretically in single-stranded but not double-stranded format which provides better accessibility for LAMP primers (as shown in FIG. 5B) than the original LAMP reaction where the templates are predominantly in double-stranded format as the reaction temperatures of 60-65° C. are usually inefficient to denature targets especially those with high GC contents and/or strong secondary structures.

Figure 6A:
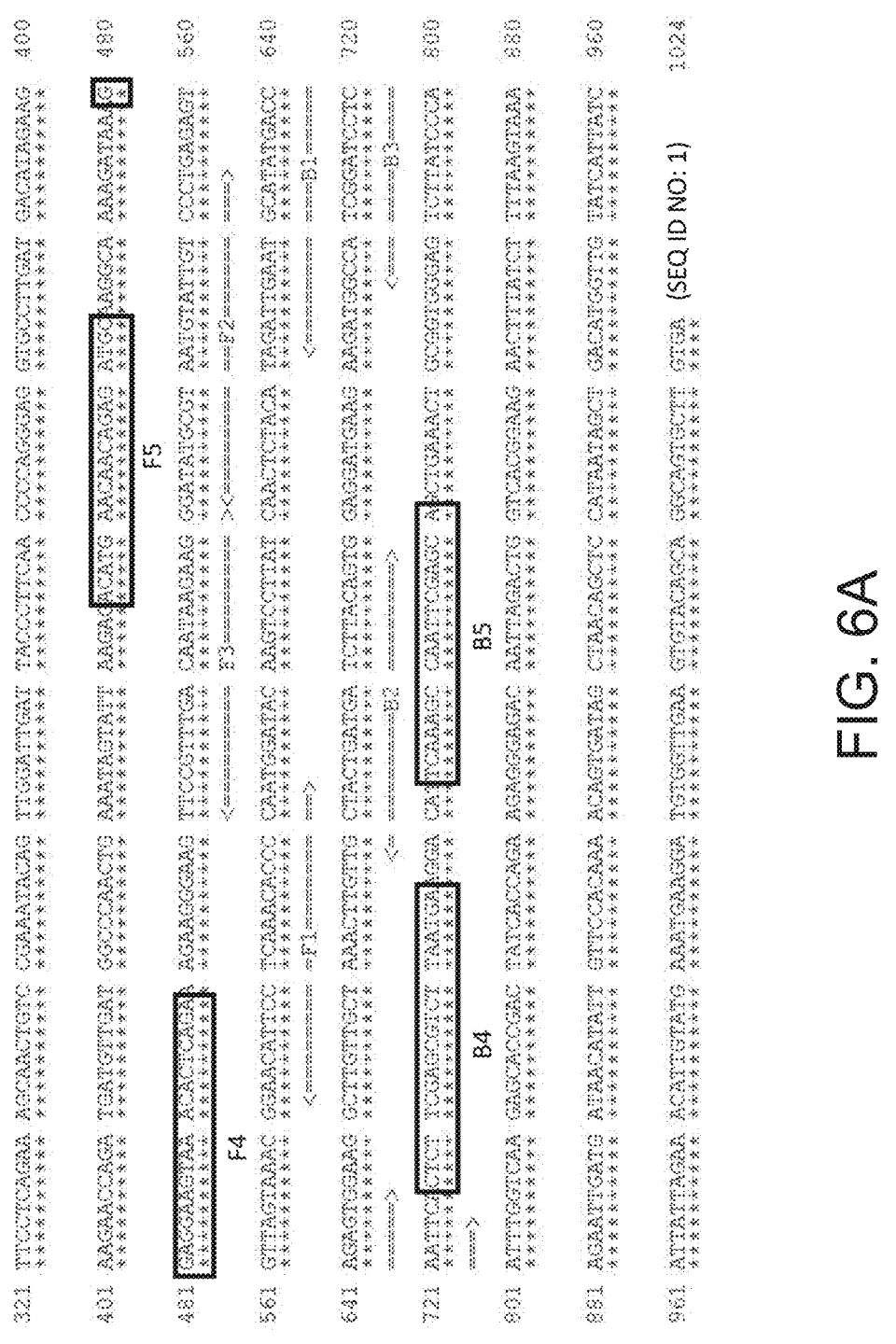

FIGS. 6A and 6B show an example demonstrating the design of the autonomy primers for Influenza virus B (FluB, GenBank: MT637911.1), wherein the partial sequence (SEQ ID NO: 1) of FluB gene is shown in FIG. 6A. In this example, two pairs of the autonomy primers, i.e. F4 (SEQ ID NO: 3), B4 (SEQ ID NO: 6), F5 (SEQ ID NO: 2), and B5 (SEQ ID NO: 7), were designed. As mentioned in the above, the design of the autonomy primers occurs after the working LAMP primer set is obtained. Therefore, the original LAMP primer set for Influenza virus B was first designed using LAMP primer design software, e.g. PrimerExplorer using default parameters, and confirmed it was working. Then the two pairs of the autonomy primers were manually designed. The primers F4 and F5 are upstream of the primer F3 (SEQ ID NO: 4), and the primers B4 and B5 are upstream of the primer B3 (SEQ ID NO: 5), as shown in FIG. 6A. As the autonomy primers act similarly as the primers F3 and B3 as displacement primers, they all have similar Tin as shown in FIG. 6B. By definition, the autonomy primers with smaller suffixing numbers are located closer to the primers F3 and B3 than those with larger numbers. The autonomy primers can be used with four LAMP primers (F3, B3, FIP, and BIP) or with additional primers including but not limiting to loop primers and stein primers as long as synergistical effects are observed.

Similarly, other autonomy primers for different target genes were designed according to the idea of the present disclosure. In the following embodiments, the autonomy primers for detection of Influenza virus B (FluB, a RNA template), Respiratory syncytial virus B (RSVB, a RNA template), Pseudomonas aeruginosa (PA, a DNA template), and Staphylococcus aureus (SA, a DNA template) were provided for illustration. Their effects for improving detection sensitivity compared to the original LAMP primers (F3, B3, FIP, and BIP) were also determined.

Figure 7A:
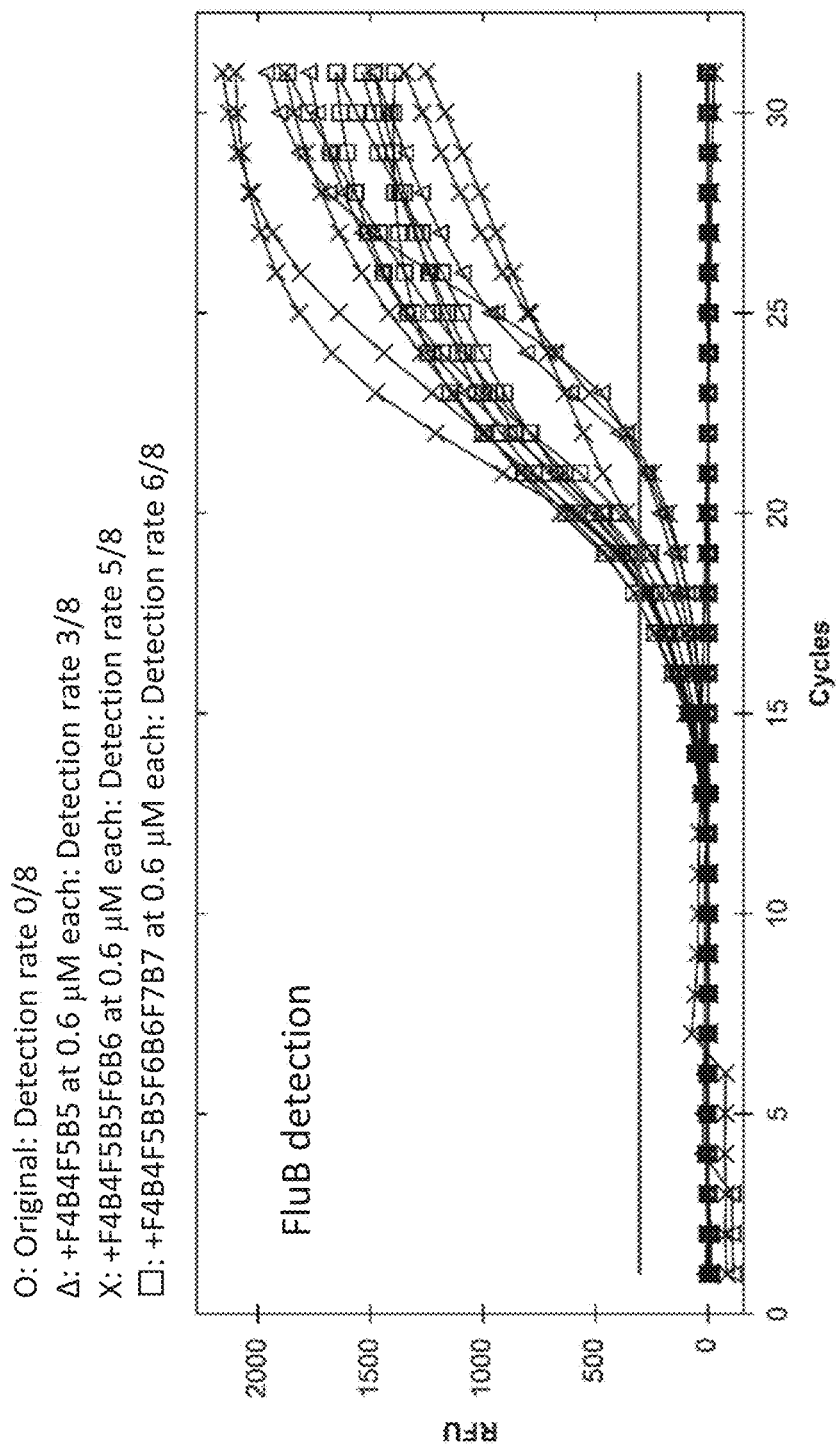
FIG. 7A shows the beneficial effects of the autonomy primers for FluB detection.

FIG. 7A shows the beneficial effects of the autonomy primers for FluB detection. The RT-LAMP reactions were performed with low template inputs, e.g. 40000× dilutions of nucleic acid extract, and the autonomy primers were used at 0.6 μM each. The conditions compared, the number of repeats, and the detection rates expressed by fractions for each target were indicated in the figure. When the RT-LAMP reactions were performed with the original LAMP primers, the detection rate was 0/8. When the RT-LAMP reactions were performed with the original LAMP primers and 2 pairs of the autonomy primers, the detection rate was 3/8. When the RT-LAMP reactions were performed with the original LAMP primers and 3 pairs of the autonomy primers, the detection rate was 5/8. When the RT-LAMP reactions were performed with the original LAMP primers and 4 pairs of the autonomy primers, the detection rate was 6/8. Therefore, when more pairs of the autonomy primers were included, higher detection rates and/or earlier detections were obtained compared to the original setup without autonomy primers.

Figure 7B:
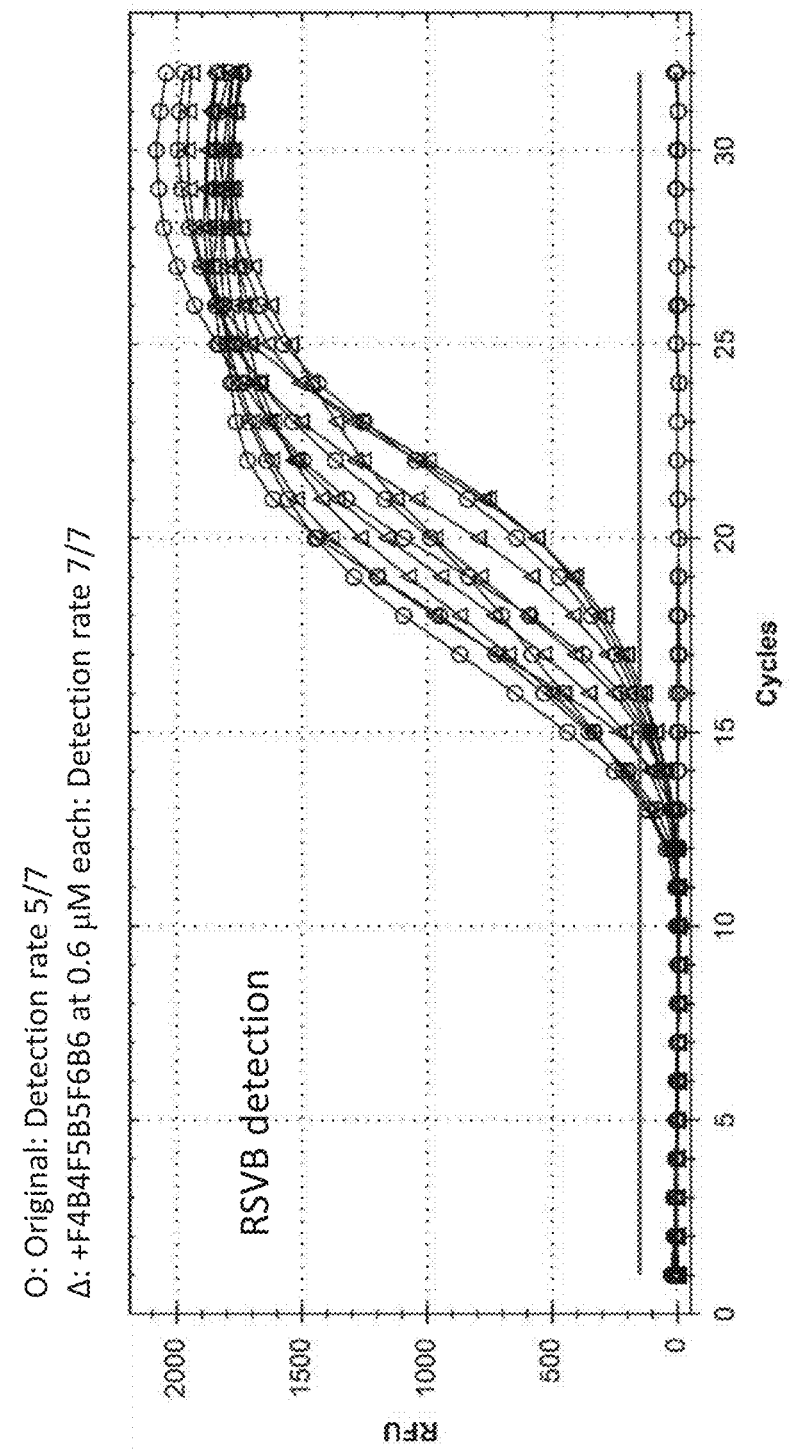
FIG. 7B shows the beneficial effects of the autonomy primers for RSVB detection.

FIG. 7B shows the beneficial effects of the autonomy primers for RSVB detection. The RT-LAMP reactions were performed with low template inputs, e.g. 75 copies of genomic RNA, and the autonomy primers were used at 0.6 μM each. When the RT-LAMP reactions were performed with the original LAMP primers, the detection rate was 5/7. When the RT-LAMP reactions were performed with the original LAMP primers and 3 pairs of the autonomy primers, the detection rate was 7/7. Therefore, the addition of the autonomy primers also improved the detection rate for RSVB.

Figure 7C:
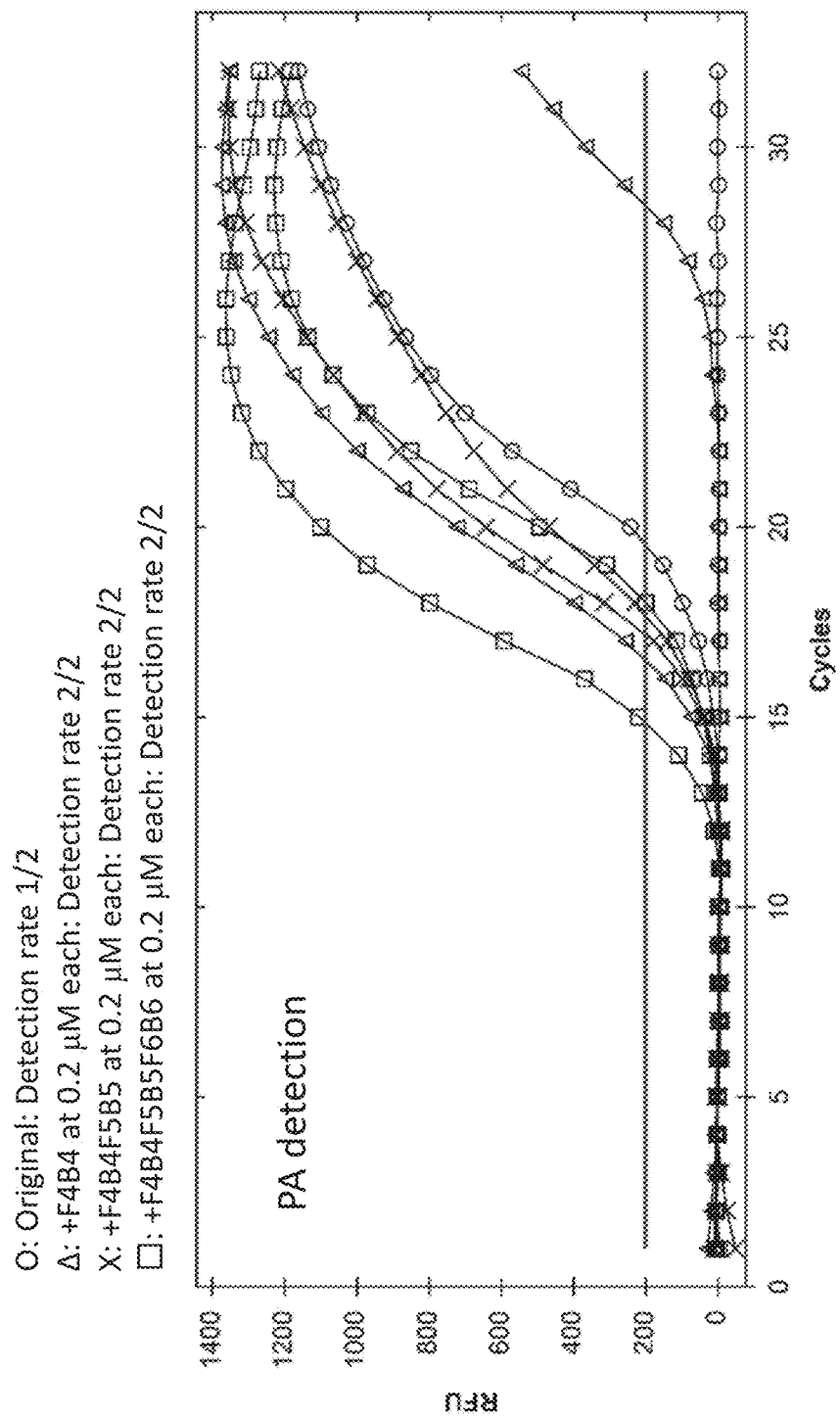
FIG. 7C shows the beneficial effects of the autonomy primers for PA detection.

FIG. 7C shows the beneficial effects of the autonomy primers for PA detection. The LAMP reactions were performed with low template inputs, e.g. 7 copies of genomic DNA, and the autonomy primers were used at 0.2 μM each. When the LAMP reactions were performed with the original LAMP primers, the detection rate was 1/2. When the LAMP reactions were performed with the original LAMP primers and 1 pair of the autonomy primers at 0.2 μM each, the detection rate was 2/2. When the LAMP reactions were performed with the original LAMP primers and 2 pairs of the autonomy primers at 0.2 μM each, the detection rate was 2/2. When the LAMP reactions were performed with the original LAMP primers and 3 pairs of the autonomy primers at 0.2 μM each, the detection rate was 2/2. Therefore, the addition of the autonomy primers also improved the detection rate for PA when at least one pair of the autonomy primers was included.

Figure 7D:
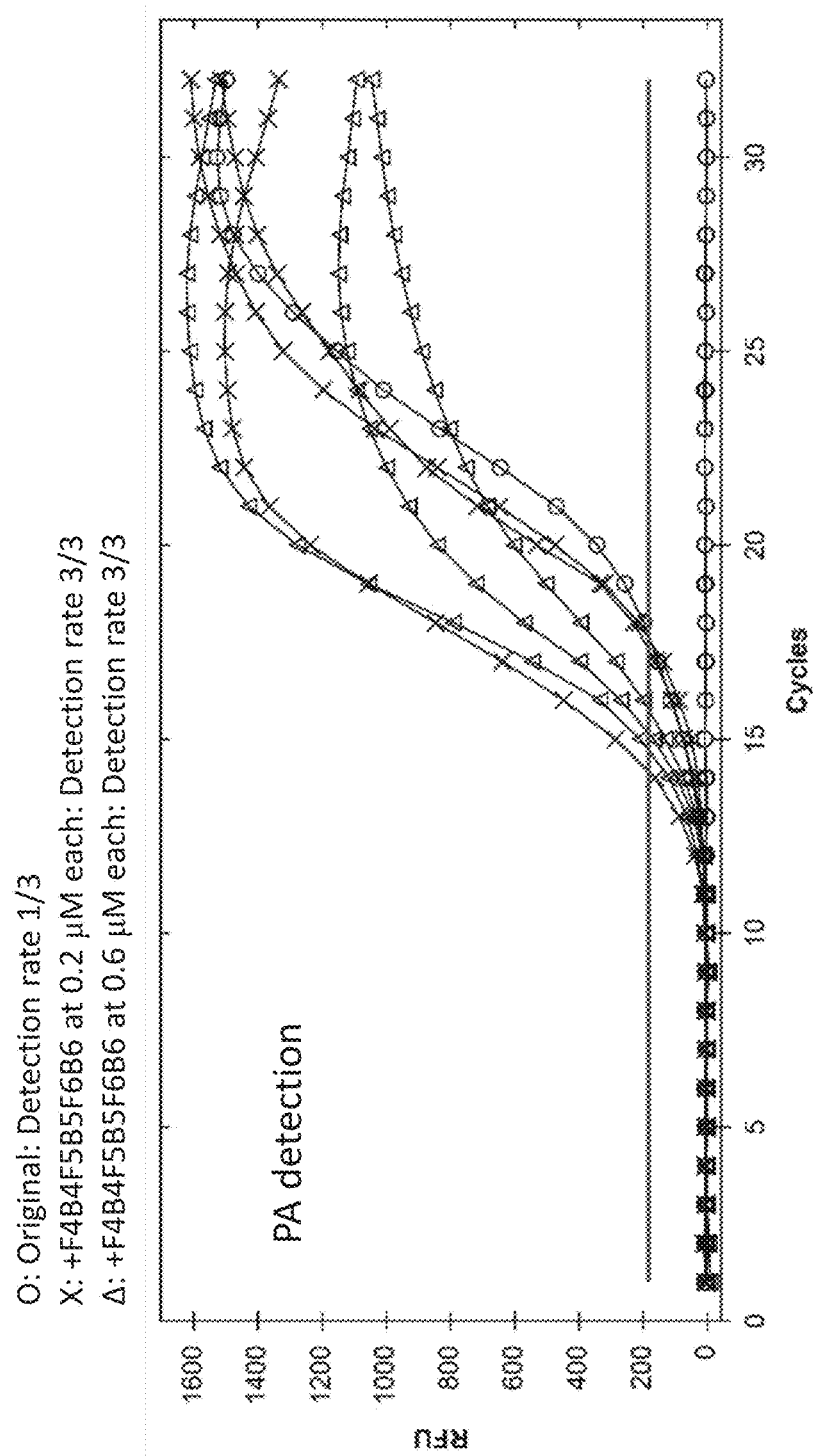
FIG. 7D shows the beneficial effects of the autonomy primers for PA detection.

FIG. 7D shows the beneficial effects of the autonomy primers for PA detection. The LAMP reactions were performed with low template inputs, e.g. 7 copies of genomic DNA, and the autonomy primers were used at 0.2 μM and 0.6 μM each. When the LAMP reactions were performed with the original LAMP primers, the detection rate was 1/3. When the LAMP reactions were performed with the original LAMP primers and 3 pairs of the autonomy primers at 0.2 μM each, the detection rate was 3/3. When the LAMP reactions were performed with the original LAMP primers and 3 pairs of the autonomy primers at 0.6 μM each, the detection rate was 3/3. Therefore, both concentrations of the autonomy primers showed higher detection rates for PA detection compared to the original setup without autonomy primers.

Figure 7E:
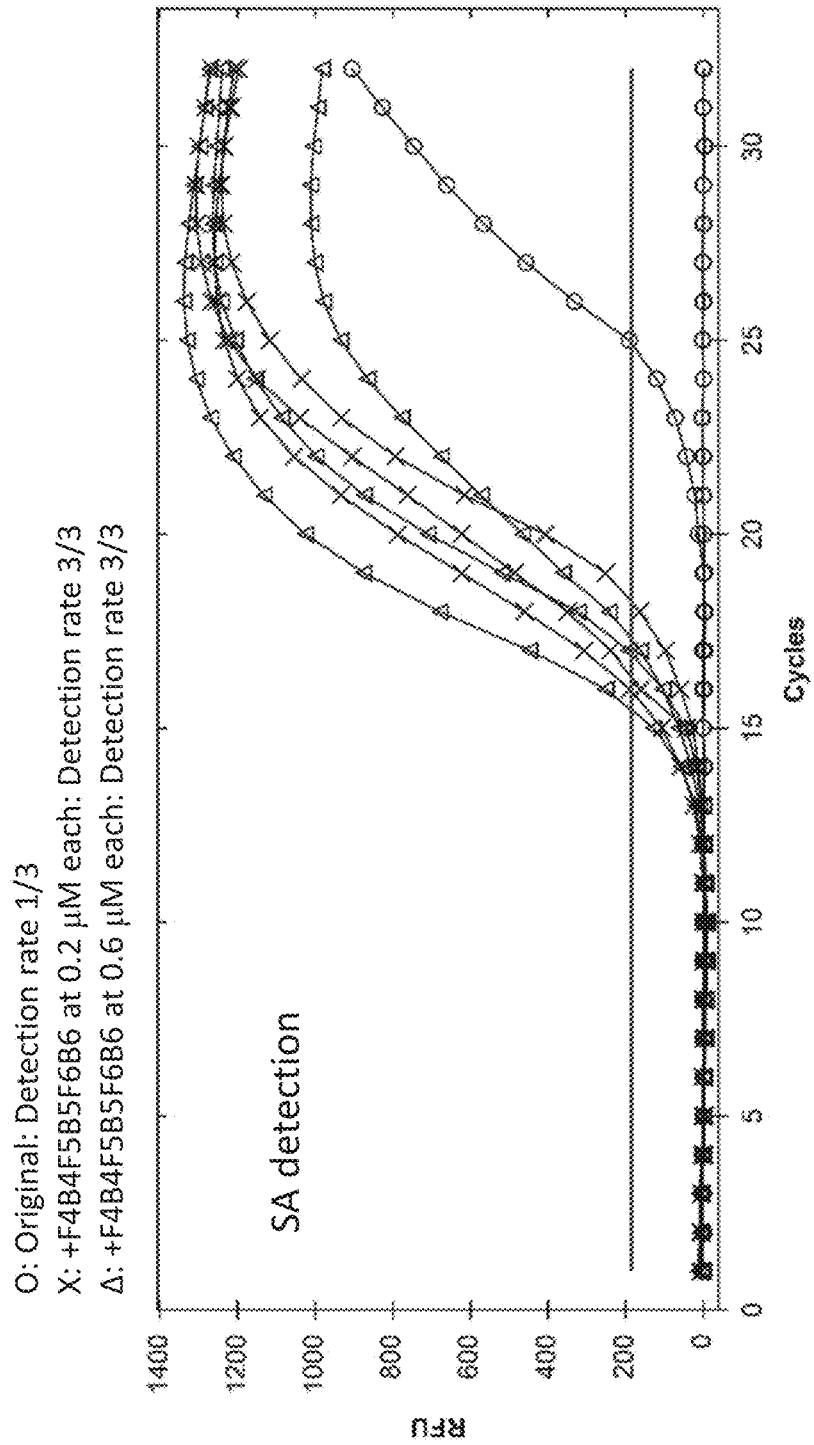
FIG. 7E shows the beneficial effects of the autonomy primers for SA detection.

FIG. 7E shows the beneficial effects of the autonomy primers for SA detection. The LAMP reactions were performed with low template inputs, e.g. 1000× dilutions of nucleic acid extract, and the autonomy primers were used at 0.2 μM and 0.6 μM each. When the LAMP reactions were performed with the original LAMP primers, the detection rate was 1/3. When the LAMP reactions were performed with the original LAMP primers and 3 pairs of the autonomy primers at 0.2 μM each, the detection rate was 3/3. When the LAMP reactions were performed with the original LAMP primers and 3 pairs of the autonomy primers at 0.6 μM each, the detection rate was 3/3. Therefore, both concentrations of the autonomy primers showed higher detection rates for SA detection compared to the original setup without autonomy primers.

The experiments results from FIGS. 7A to 7E demonstrated higher detection rates and/or earlier detection at low template inputs when at least one pair of the autonomy primers was included for detection of FluB, RSVB, PA, and SA. Additive and beneficial effects of more pairs of the autonomy primers were shown as well.

Figure 8A:
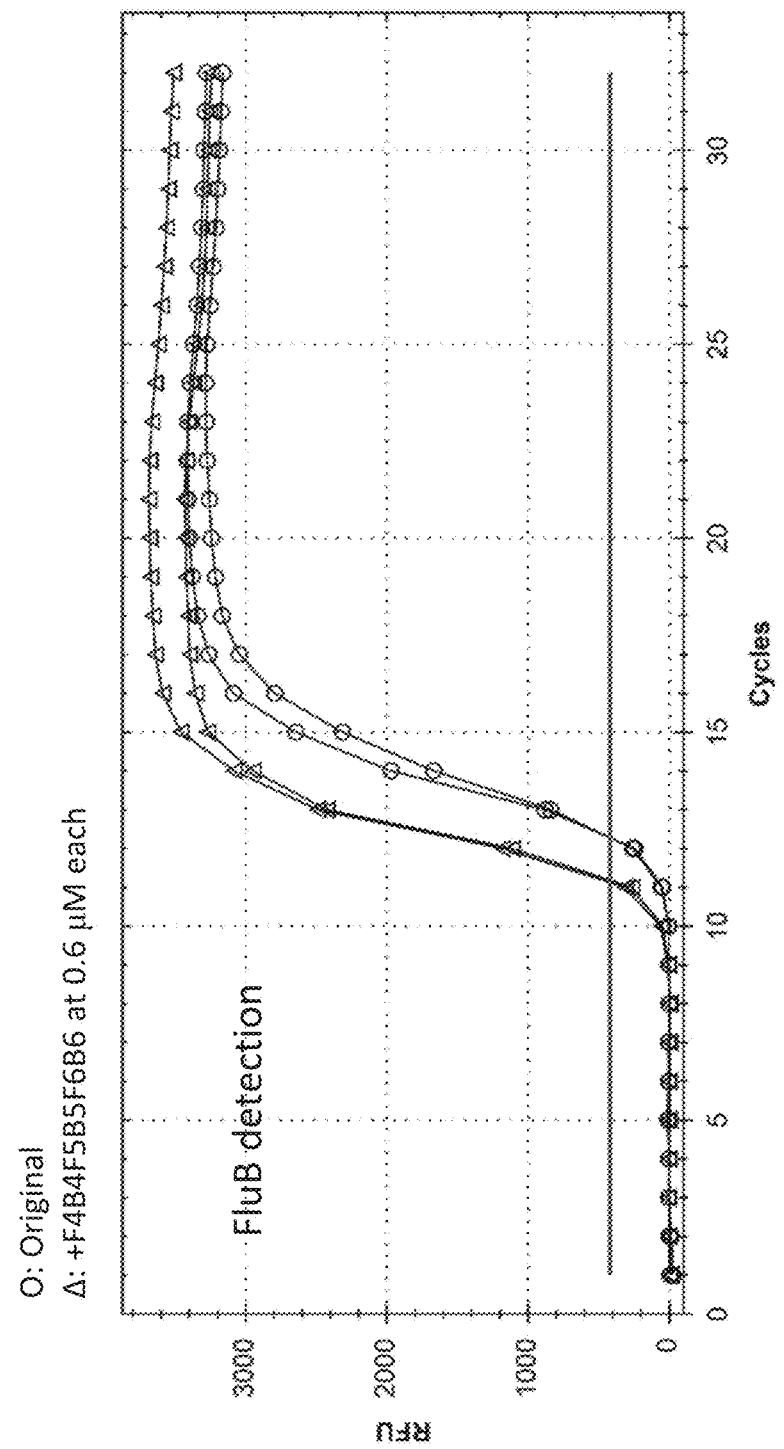
FIGS. 8A to 8C show the beneficial effects of the autonomy primers to improve FluB, PA, and SA detection.
Figure 8B:
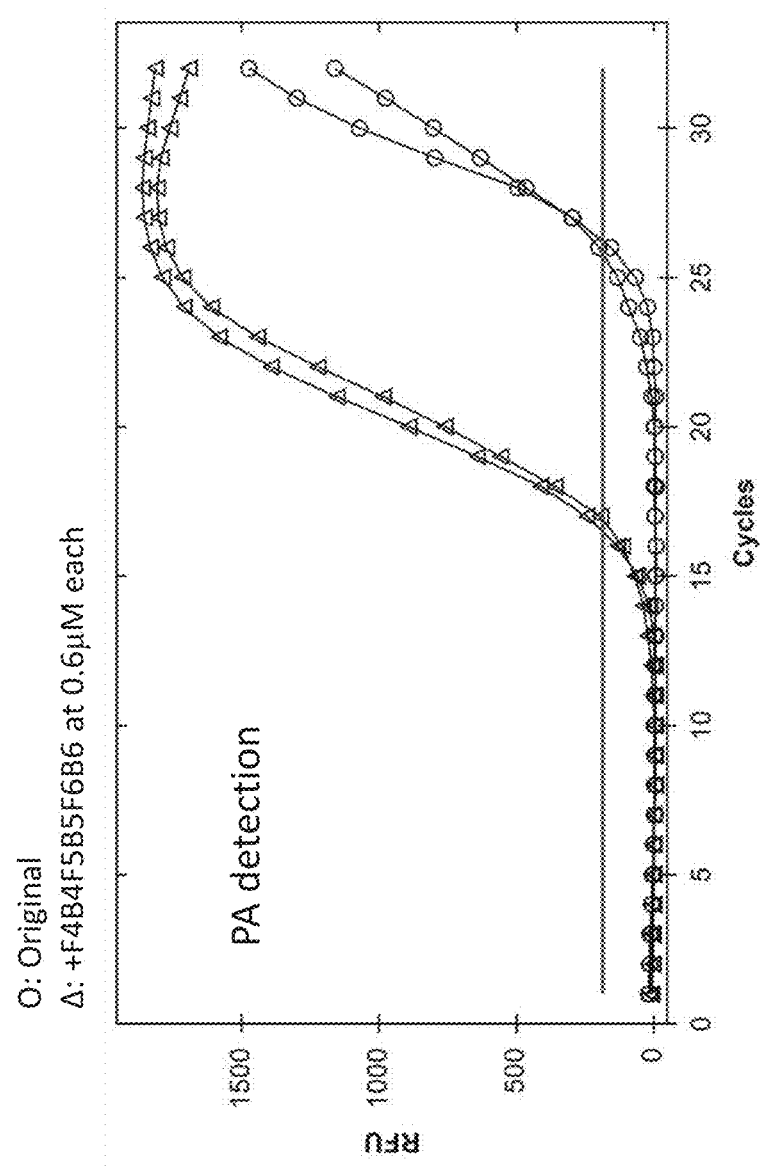
Figure 8C:
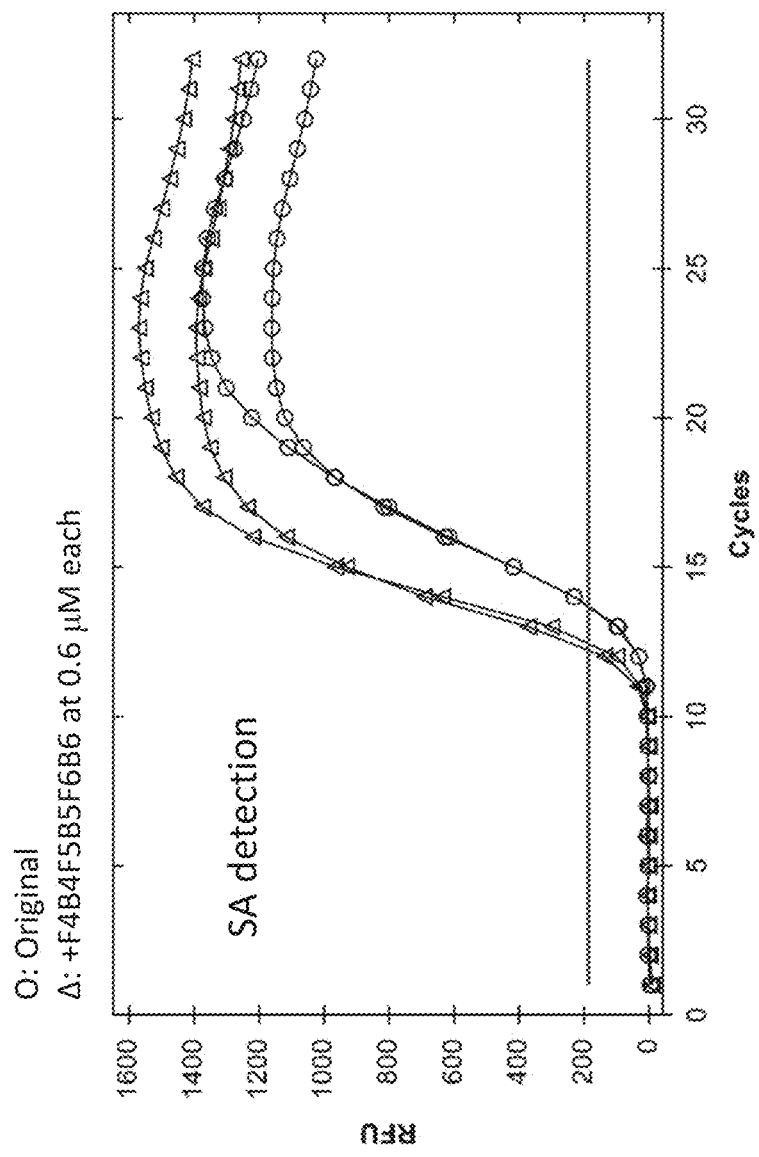

FIGS. 8A to 8C show the beneficial effects of the autonomy primers to improve FluB, PA, and SA detection by (RT-)LAMP with high template inputs. For example, the template input for FluB includes 200× dilutions of nucleic acid extract, the template input for PA includes 1500 copies of genomic DNA, and the template input for SA includes 100× dilutions of nucleic acid extract. The conditions compared were reaction setups with and without 3 pairs of the autonomy primers. For all three targets, earlier detections were noticed when 3 pairs of the autonomy primers were included compared to the original setup without autonomy primers. From FIGS. 8A to 8C, when the template inputs were high, there was no difference in detection rate which is 100%. The beneficial effects of the autonomy primers under such conditions were demonstrated by earlier detections for FluB, PA and SA when the autonomy primers were used compared to the original formula without them.

Figure 9A:
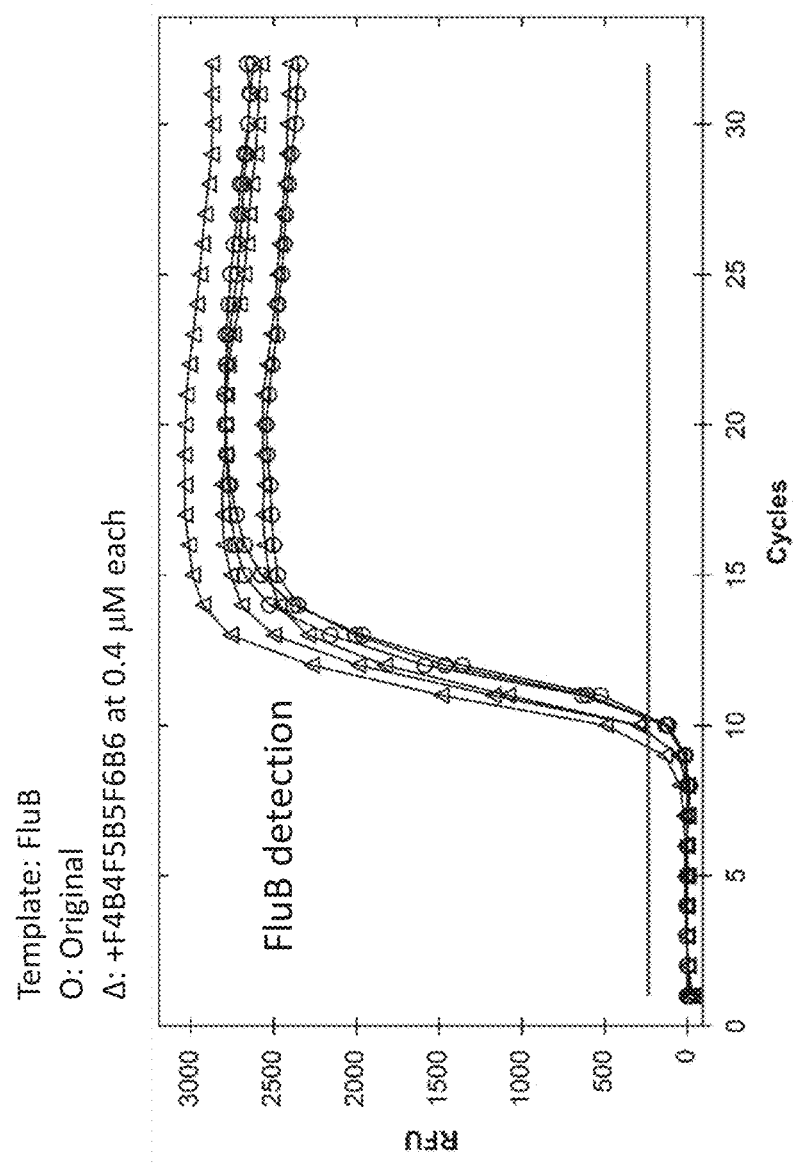
FIGS. 9A to 9C show the specificity assay of the autonomy primers for FluB detection.
Figure 9B:
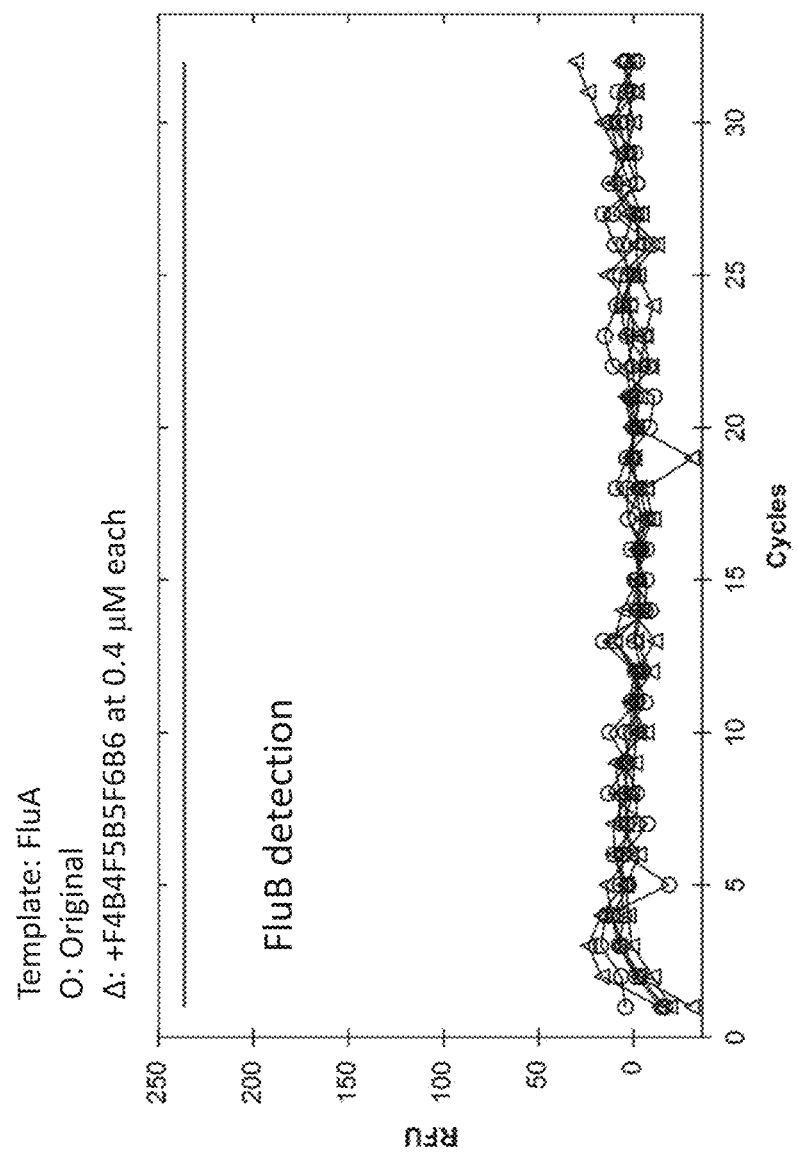
Figure 9C:
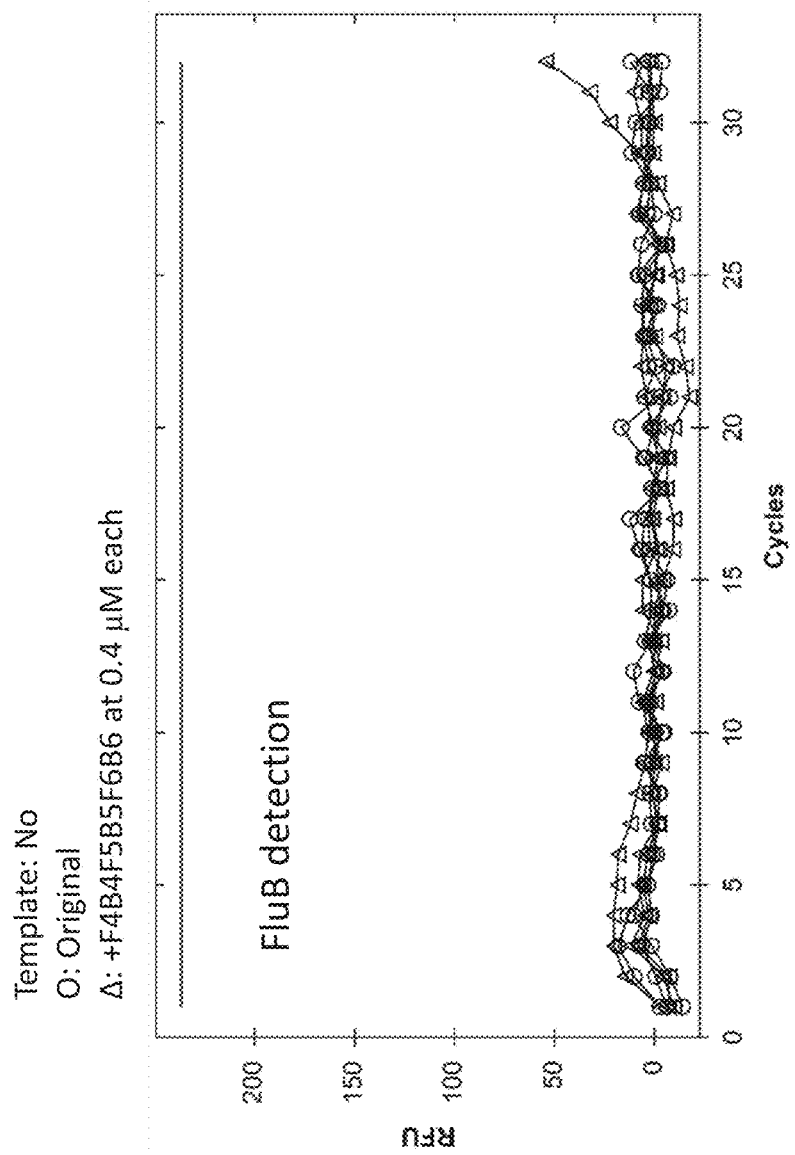
Figure 10A:
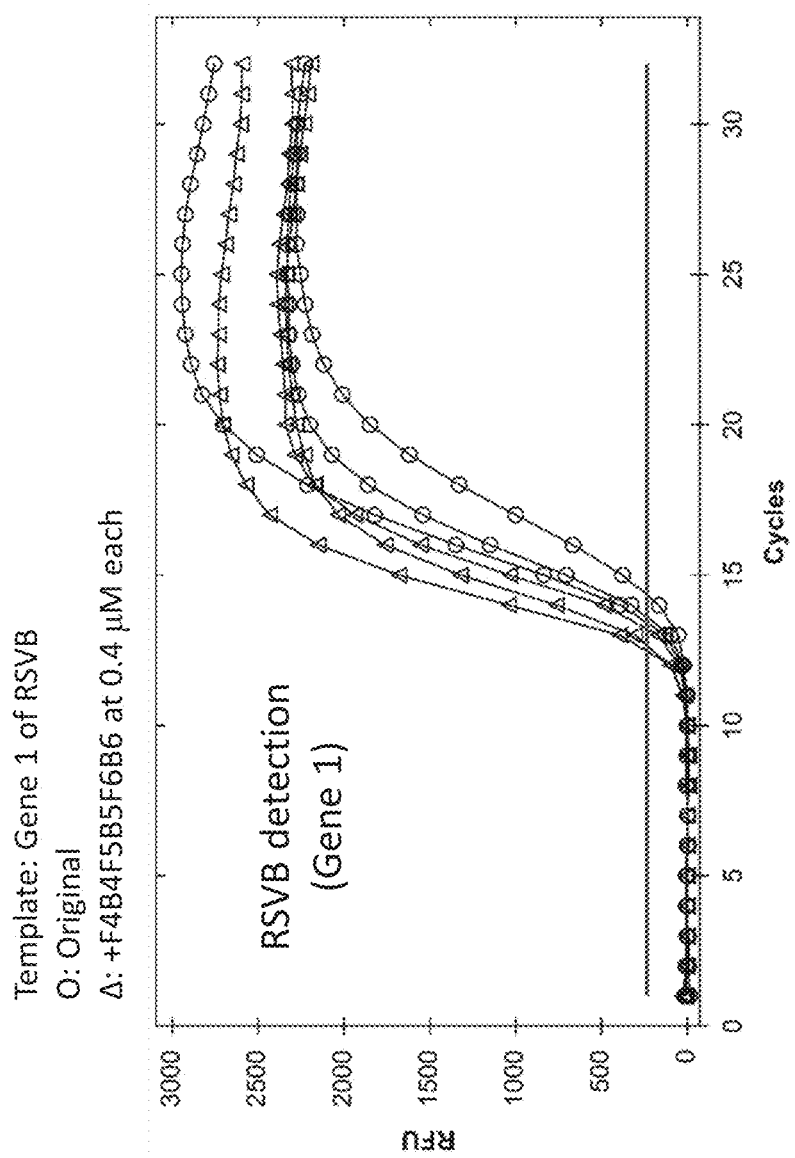
FIGS. 10A to 10C show the specificity assay of the autonomy primers for RSVB detection targeting gene 1.
Figure 10B:
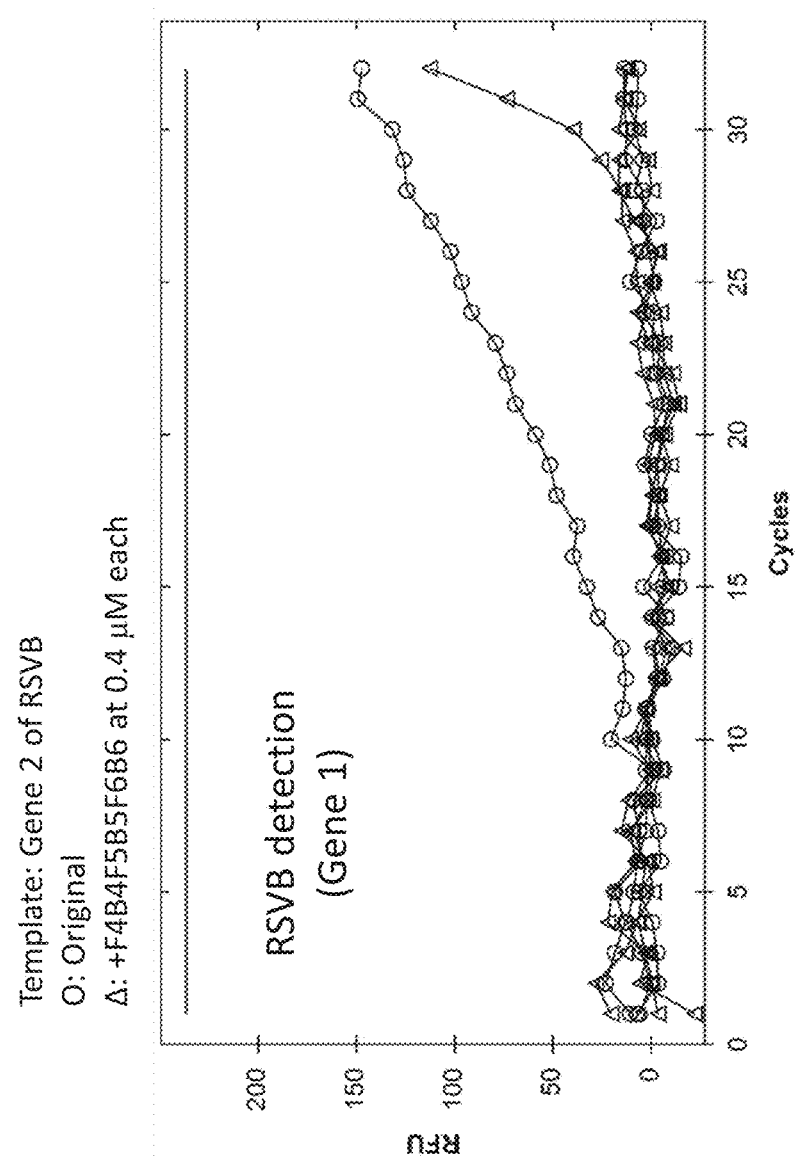
Figure 10C:
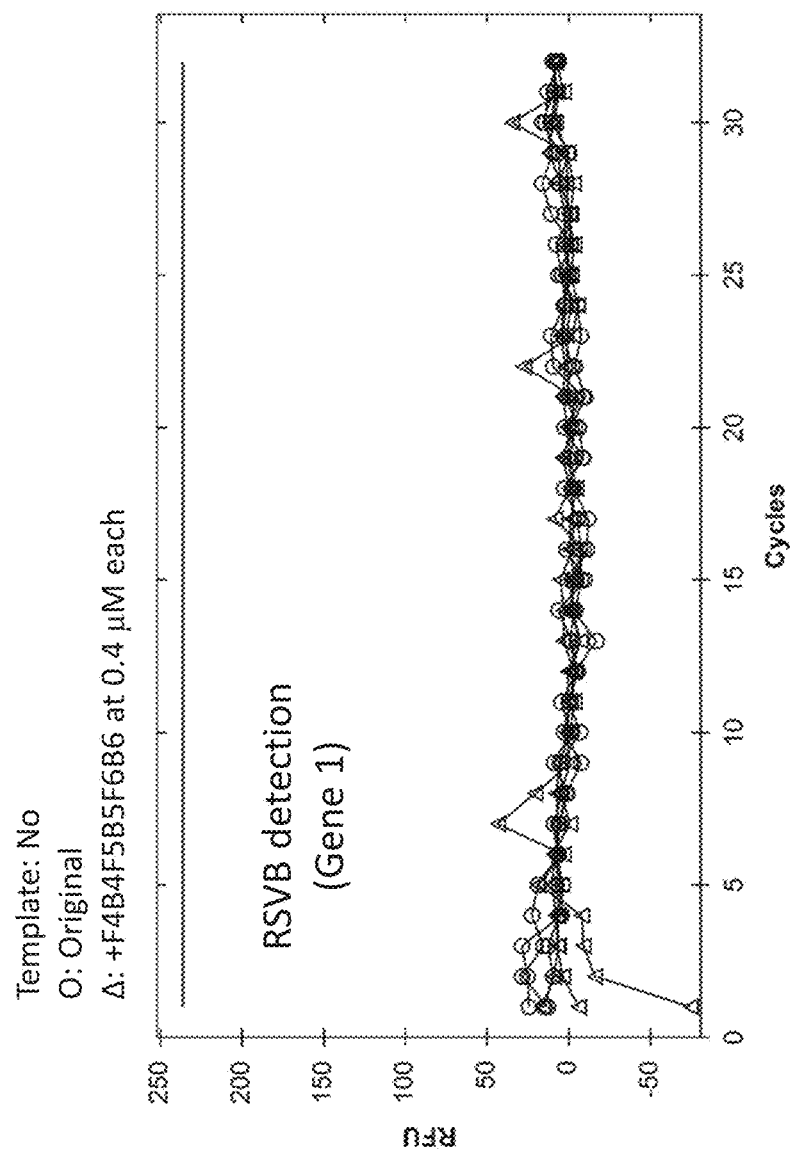
Figure 11A:
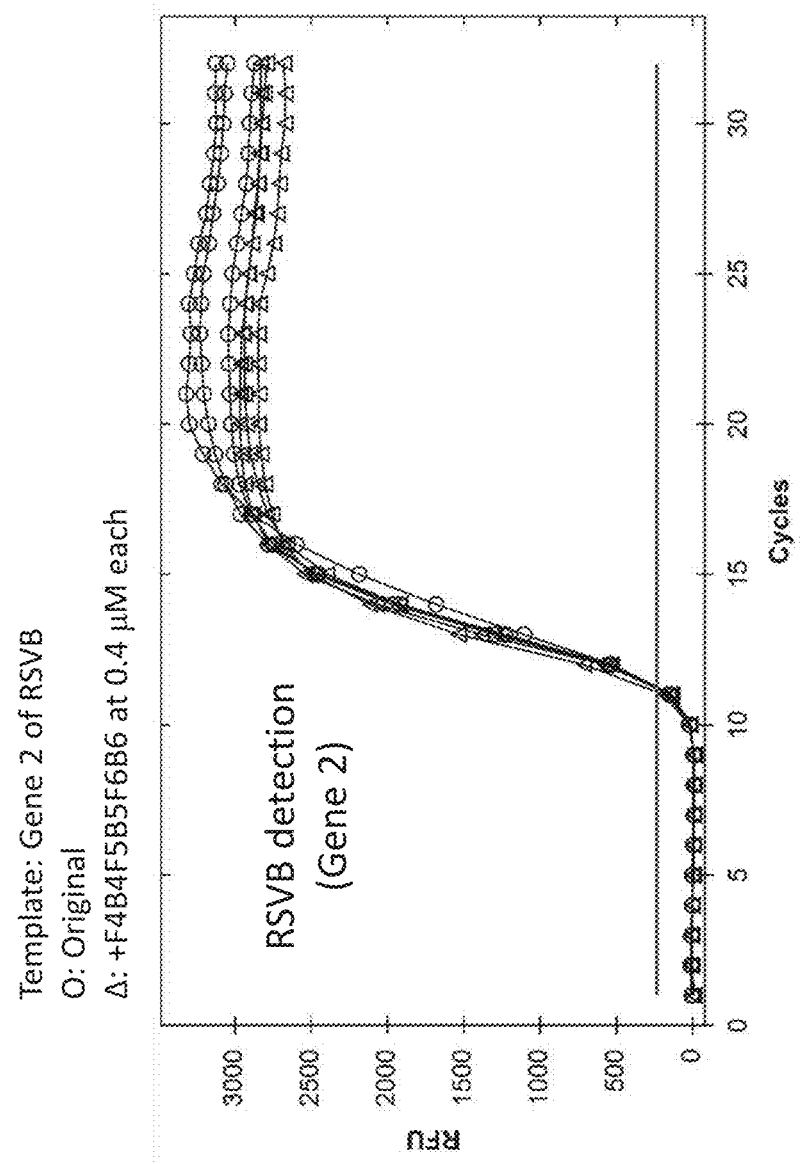
FIGS. 11A to 11C show the specificity assay of the autonomy primers for RSVB detection targeting gene 2.
Figure 11B:
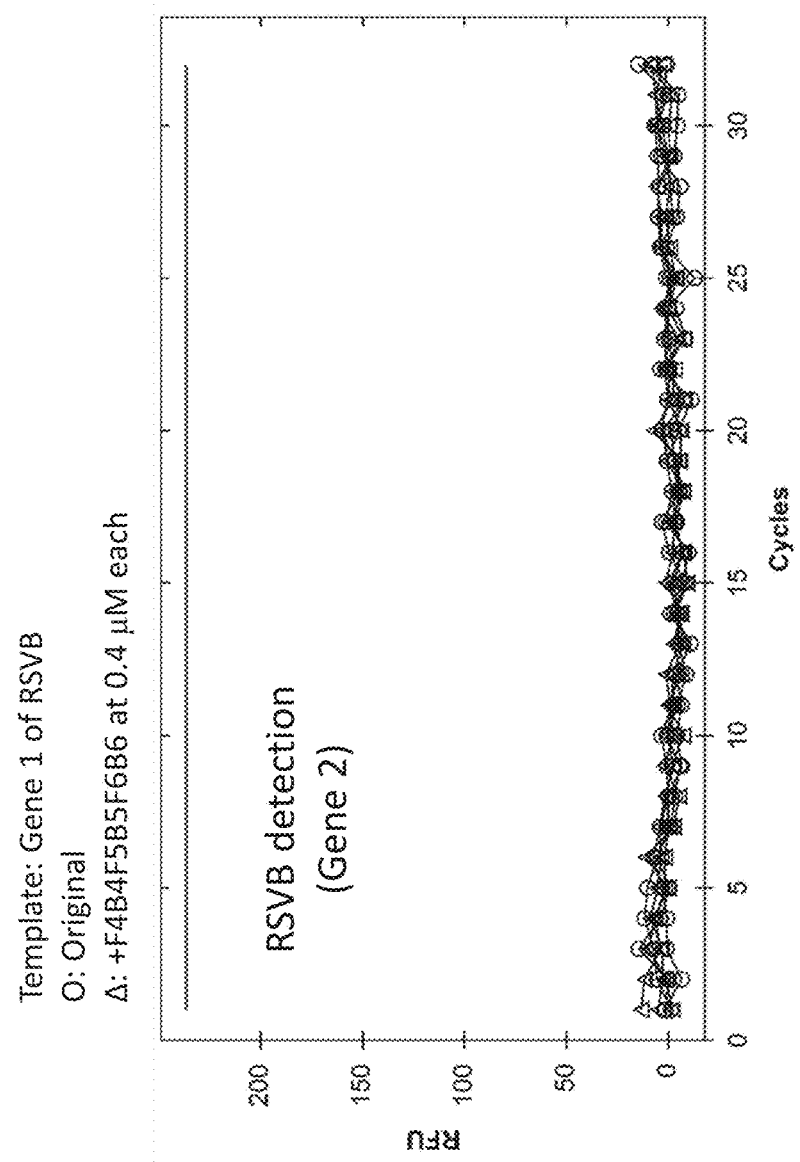
Figure 11C:
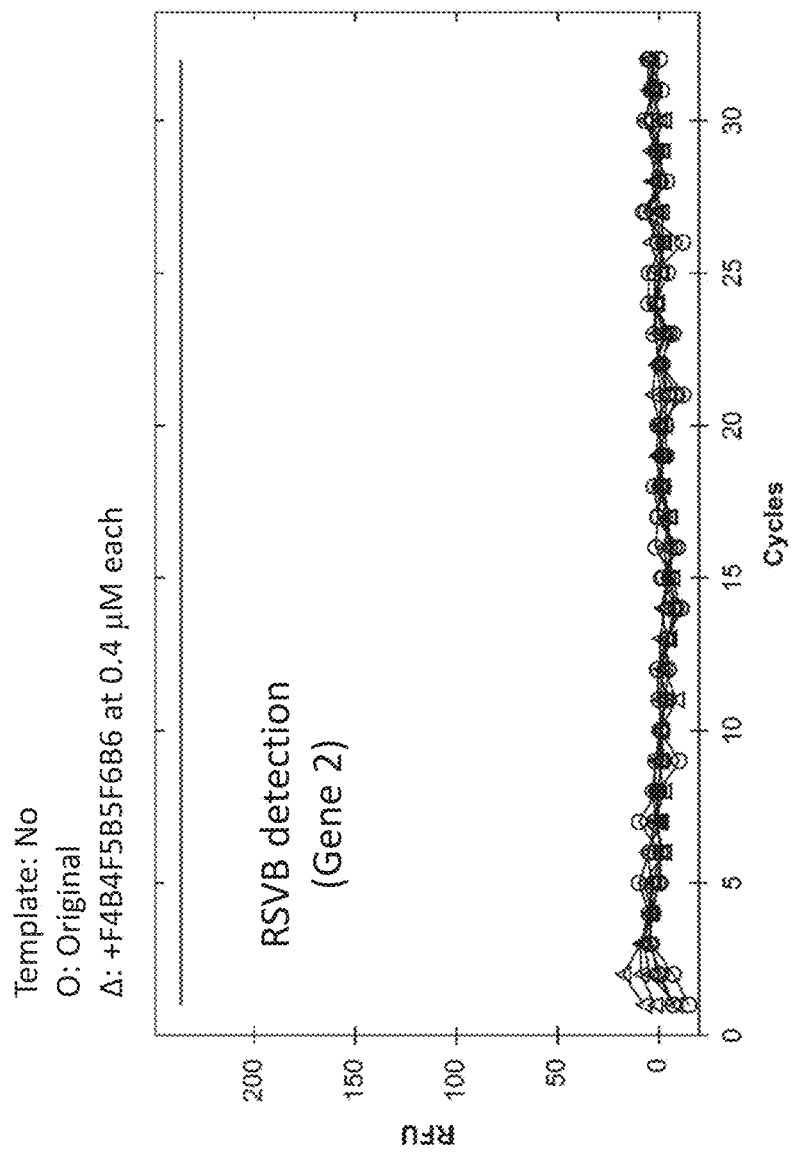

Further, the effects of 3 pairs of the autonomy primers on reaction specificity for FluB and RSVB detection by RT-LAMP were also determined. In the experiments, three sets of LAMP primers for one FluB gene and two RSVB genes (gene 1 and gene 2) with and without 3 pairs of the autonomy primers were tested. FIGS. 9A to 9C show the specificity assay of the autonomy primers for FluB detection. FIGS. 10A to 10C show the specificity assay of the autonomy primers for RSVB detection targeting gene 1. FIGS. 11A to 11C show the specificity assay of the autonomy primers for RSVB detection targeting gene 2. The primers were tested with their correct template (FIGS. 9A, 10A, 11A), with different genotypes of the same viruses at high concentrations (FIGS. 9B, 10B, 11B), and without templates (NTC control; FIGS. 9C, 10C, 11C). It is observed that only correct templates were amplified. Therefore, the reaction specificity did not change for all the three sets of LAMP primers tested with addition of the autonomy primers. No NTC amplification was observed either. That is to say, with ability to improve target detection sensitivity, the autonomy primers did not compromise detection specificity for FluB and RSVB.

From the experiment results, the beneficial effects of the autonomy primers were more obvious when more numbers of the autonomy primers were used. In some embodiments, the efficient and optimal concentrations of the autonomy primers are in the range of 0.1 µM to 2 µM, and preferably in the range of 0.2 µM to 1.2 µM. Too low concentrations are inadequate to produce enough templates for LAMP primers while too high concentrations probably consume too much components for maximal amount of LAMP amplicons to be generated. For a specific template and LAMP reaction setup, primer formulas with the autonomy primers are to be experimentally determined for the best performance.

Figure 12:
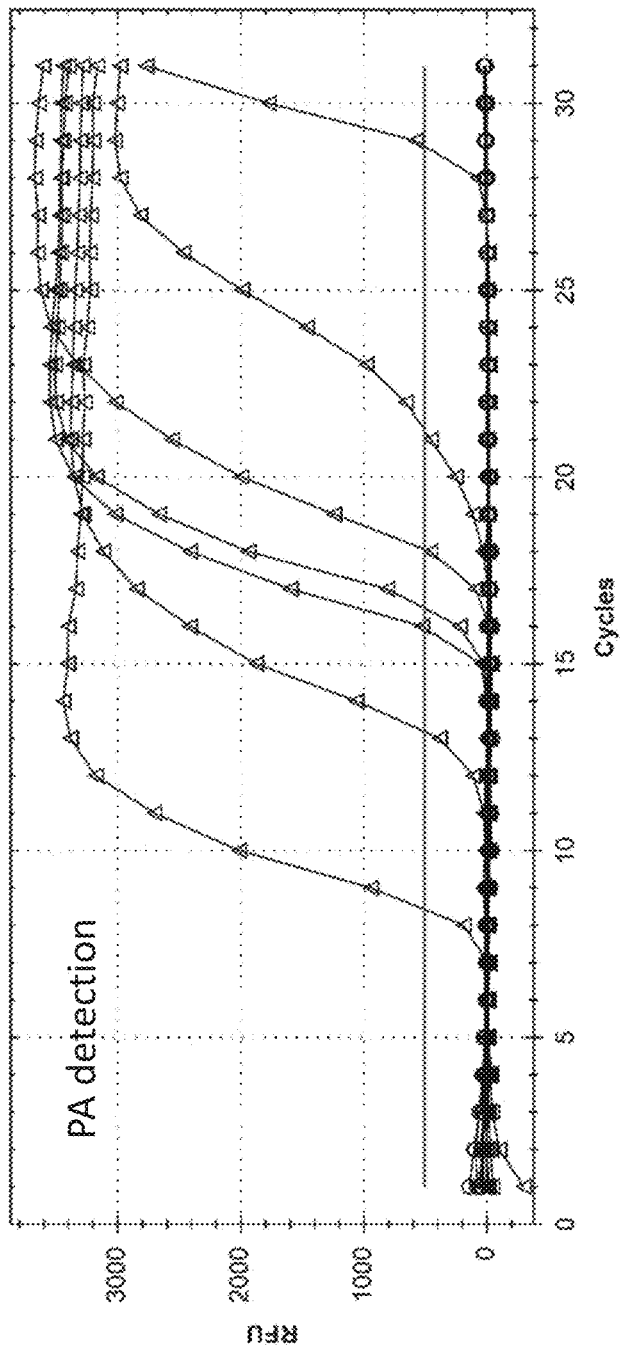
FIG. 12 shows the beneficial effects of the autonomy primers for PA detection with a thermal protocol having changing temperatures for each cycle.

Besides, when applying the autonomy primers, the nucleic acid amplification thermal protocol can be either isothermal or with changing temperatures. FIG. 12 shows the beneficial effects of the autonomy primers for PA detection with a thermal protocol having changing temperatures for each cycle. The thermal protocol was 31 cycles of 70° C. for 20s and 65° C. for 40s. When the LAMP reactions were performed with the original LAMP primers, the detection rate was 0/7. When the LAMP reactions were performed with the original LAMP primers and 3 pairs of the autonomy primers at 0.6 µM each, the detection rate was increased to 6/7. Therefore, the addition of the autonomy primers is also beneficial to nucleic acid amplification with a thermal protocol having changing temperatures.

Figure 13A:
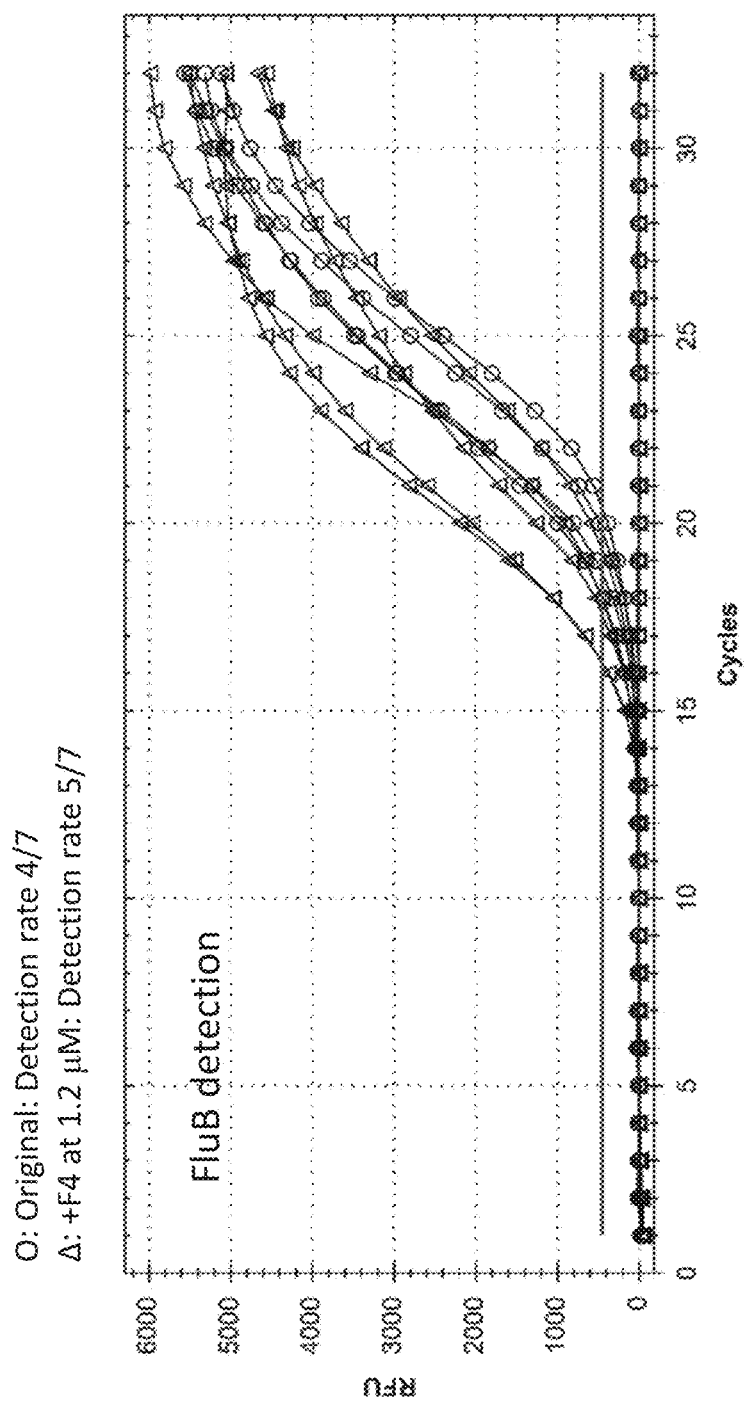
FIGS. 13A and 13B show the beneficial effects of the autonomy primers for FluB detection using a single autonomy primer F4 and in combination with a pair of autonomy primers F5 and B5.
Figure 13B:
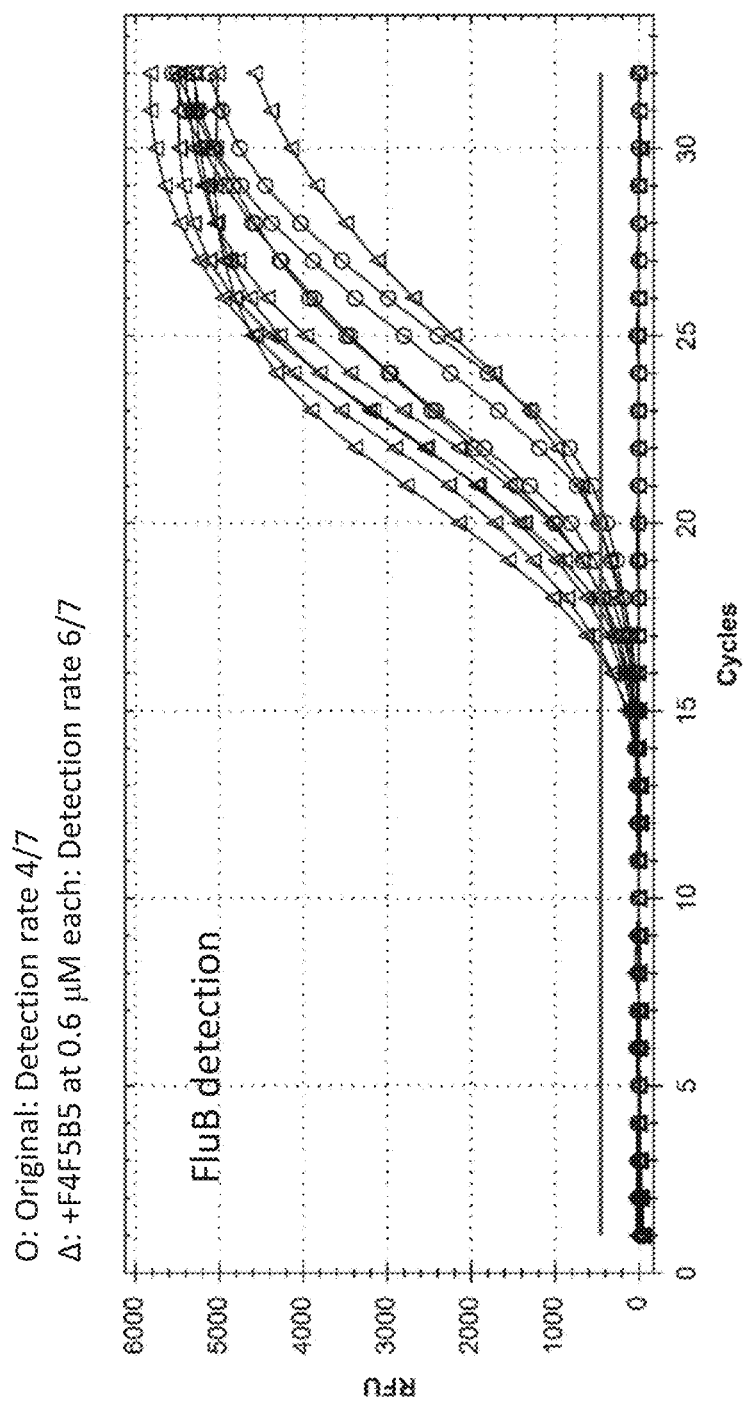

In addition, the autonomy primers can be introduced singly, in pairs and combination of both. FIGS. 13A and 13B show the beneficial effects of the autonomy primers for FluB detection using a single autonomy primer F4 and in combination with a pair of autonomy primers F5 and B5. The thermal protocol was 31 cycles of 65° C. for 1min. As shown in FIGS. 13A and 13B, the single use of the autonomy primer and its combination with another pair of autonomy primers both improved the detection rates for FluB detection.

From the above, the use of the autonomy primers is an efficient way to increase detection sensitivity of LAMP-based nucleic acid amplification. The method provided in the present disclosure has obvious and outstanding advantages in terms of design over the others where additional primers, namely loop primers, stein primers and swarm primers, are introduced to the original LAMP primers, i.e. F3, B3, FIP, and BIP. Those methods target the same region as the original LAMP amplicon, which limits locations and numbers of the additional primers due to length constraint. On the contrary, unprecedentedly freedom in primer design is guaranteed by this new method because the autonomy primers are located outside the LAMP amplicon and beyond the region from B3 to F3. As many autonomy primers as allowed by the LAMP reaction setup can be designed and better performance is ensured due to their probable working mechanism of displacement of amplicons generated by the working LAMP primer sets with or without loop primers and amplified amounts of templates probably in single-stranded format with better accessibility for the working LAMP primers.

While the disclosure has been described in terms of what is presently considered to be the most practical and preferred embodiments, it is to be understood that the disclosure does not need to be limited to the disclosed embodiment. On the contrary, it is intended to cover various modifications and similar arrangements included within the spirit and scope of the appended claims which are to be accorded with the broadest interpretation so as to encompass all such modifications and similar structures.

The Sequence Listing material in the ASCII text file having the file name, "15248-1559_SEQ_LISTING.txt" created Oct. 7, 2022, with a file size of 2,518 bytes, is incorporated by reference.

What is claimed is:

1. A LAMP primer set, comprising LAMP primers of FIP, BIP, F3, and B3, and at least one additional primer,
wherein the LAMP primers of FIP, BIP, F3, and B3 target regions F3, F2, F1C, B1C, B2, and B3 on nucleic acids, and the regions F3, F2, F1, B1C, B2C, and B3C are located in order from 5' end to 3' end of a forward strand of the nucleic acids;
wherein the primer FIP comprises oligonucleotides targeting the regions F1C and F2, and the primer BIP comprises oligonucleotides targeting the regions B1C and B2; and
wherein the at least one additional primer targets a region located beyond-outside a region from F3 to B3.

2. The LAMP primer set according to claim 1, wherein the nucleic acids are DNA or RNA.

3. The LAMP primer set according to claim 1, wherein the targeted region of the at least one additional primer is located upstream of the region F3 or the region B3.

4. The LAMP primer set according to claim 1, wherein the at least one additional primer comprises at least one pair of additional primers targeting regions F4 and B4, the region F4 is located upstream of the region F3, and the region B4 is located upstream of the region B3.

5. The LAMP primer set according to claim 1, wherein the at least one additional primer comprises two pairs of additional primers targeting regions F4, B4, F5 and B5, the region F5 is located upstream of the region F4 which is located upstream of the region F3, and the region B5 is located upstream of the region B4 which is located upstream of the region B3.

6. The LAMP primer set according to claim 1, wherein the at least one additional primer comprises three pairs of additional primers targeting regions F4, B4, F5, B5, F6, and B6, the region F6 is located upstream of the region F5, the region F4, and the region F3 in turn, and the region B6 is located upstream of the region B5, the region B4, and the region B3 in turn.

7. The LAMP primer set according to claim 1, wherein a working concentration of the at least one additional primer is in a range of 0.1 μM to 2 μM.

8. The LAMP primer set according to claim 1, wherein the region from F3 to B3 is at least 200 nucleotides long.

9. A method for amplifying nucleic acids, comprising steps of:
providing LAMP primers of FIP, BIP, F3, and B3, wherein the LAMP primers of BIP BIP, F3, and B3 target regions F3, F2, F1C, B1C, B2, and B3 on nucleic acids, and the regions F3, F2, F1, B1C, B2C, and B3C are located in order from 5' end to 3' end of a forward strand of the nucleic acids, wherein the primer FIP comprises oligonucleotides targeting the regions F1C and F2, and the primer BIP comprises oligonucleotides targeting the regions B1C and B2;
providing at least one additional primer, wherein the at least one autonomy additional primer targets a region located outside a region from F3 to B3; and
amplifying nucleic acids of a sample with the LAMP primers of FIP BIP F3, and B3 and the at least one additional primer.

10. The method according to claim 9, wherein the nucleic acids are amplified using a polymerase with strand-displacement activity.

11. The method according to claim 9, wherein the nucleic acids are DNA or RNA.

12. The method according to claim 9, wherein the targeted region of the at least one additional primer is located upstream of the region F3 or the region B3.

13. The method according to claim 9, wherein the at least one additional primer comprises at least one pair of additional primers targeting regions F4 and B4, the region F4 is located upstream of the region F3, and the region 4 is located upstream of the region B3.

14. The method according to claim 9, wherein the at least one additional primer comprises two pairs of additional primers targeting regions F4, B4, F5, and B5, the region F5 is located upstream of the region F4 which is located upstream of the region F3, and the region B5 is located upstream of the region B4 which is located upstream of the region B3.

15. The method according to claim 9, wherein the at least one additional primer comprises three pairs of additional primers targeting regions F4, B4, F5, B5, F6, and B6, the region F6 is located upstream of the region F5, the region F4, and the region F3 in turn, and the region B6 is located upstream of the region B5, the region B4, and the region B3 in turn.

16. The method according to claim 9, wherein a working concentration of the at least one additional primer is in a range of 0.1 μM to 2 μM.

17. The method according to claim 9, wherein the region from F3 to B3 is at least 200 nucleotides long.

18. The LAMP primer set according to claim 1, wherein a working primer set comprising the LAMP primers of FIP, BIP, F3, and B3 is an anchor point for the at least one additional primer.

19. The LAMP primer set according to claim 4, wherein the at least one additional primer acts as a displacement primer to displace amplicons generated by the primer FIP and generate templates for the primer BIP.

20. The LAMP primer set according to claim 5, wherein amplicons generated by the additional primer located closer to the primer F3 is displaced by the additional primer located at its upstream, which provides single-stranded templates for the primer BIP.

* * * * *